United States Patent
Maruta

(10) Patent No.: US 7,529,082 B2
(45) Date of Patent: May 5, 2009

(54) PLASMA TELEVISION, FLAT PANEL DISPLAY FIXING STRUCTURE, FLAT PANEL TELEVISION, AND METHOD OF ASSEMBLING FLAT PANEL TELEVISION

(75) Inventor: Naoto Maruta, Daito (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 362 days.

(21) Appl. No.: 11/104,767

(22) Filed: Apr. 13, 2005

(65) Prior Publication Data
US 2005/0236548 A1 Oct. 27, 2005

(30) Foreign Application Priority Data
Apr. 16, 2004 (JP) ............................. 2004-121731
Apr. 16, 2004 (JP) ............................. 2004-121742

(51) Int. Cl.
  *H05K 5/00* (2006.01)
  *H05K 7/00* (2006.01)
  *G06F 1/16* (2006.01)
(52) U.S. Cl. .................. 361/681; 361/682; 248/201; 248/918; 248/919; 248/924; 248/917; 248/121; 312/7.2; 312/265.5; 312/265.6; 348/836; 348/839; 348/843
(58) Field of Classification Search .......... 248/201, 248/918, 919, 924, 917, 121; 312/7.2, 265.5, 312/265.6; 361/681, 682; 348/836, 839, 348/843
See application file for complete search history.

(56) References Cited

U.S. PATENT DOCUMENTS

| | | | |
|---|---|---|---|
| 6,181,390 B1 * | 1/2001 | Wang et al. | 349/58 |
| 6,688,576 B2 * | 2/2004 | Oishi et al. | 248/317 |
| 6,807,051 B2 * | 10/2004 | Takahashi | 361/681 |
| 6,816,364 B2 * | 11/2004 | Helot et al. | 361/681 |
| 6,966,617 B2 * | 11/2005 | Chen et al. | 312/7.2 |
| 7,070,156 B2 * | 7/2006 | Liao | 248/466 |
| 2005/0237438 A1 * | 10/2005 | Maruta | 348/797 |

(Continued)

FOREIGN PATENT DOCUMENTS

JP    2000-305066    11/2000

(Continued)

OTHER PUBLICATIONS

Japanese Notice of the reason for refusal, dated Dec. 19, 2007.

*Primary Examiner*—J. Allen Shriver, II
*Assistant Examiner*—Nkeisha J Dumas
(74) *Attorney, Agent, or Firm*—Yokoi & Co., U.S.A., Inc.

(57) ABSTRACT

Each of attachments 50 has fixtures formed in a base part 51 for fixation to metal fixtures 80a and 80b. It also has a projecting part 52 having two surfaces formed on its side which opposes one of brackets 20. The two surfaces differ in height by an amount corresponding to the difference in height between the metal fixtures 80a and 80b. Each of the two surfaces has a fixture formed thereon. The brackets 20 each have screw holes and clearance holes formed in their portions which oppose, when their vertical locations relative to PDP 10a and PDP 10b are kept unchanged, the attachments 50 fixed to the metal fixtures 80a and 80b, respectively.

11 Claims, 13 Drawing Sheets

U.S. PATENT DOCUMENTS

| | | | |
|---|---|---|---|
| 2005/0264985 A1* | 12/2005 | Kim et al. | 361/681 |
| 2007/0090734 A1* | 4/2007 | Maruta | 312/223.2 |
| 2007/0091223 A1* | 4/2007 | Maruta et al. | 349/58 |
| 2007/0097608 A1* | 5/2007 | Matsutani et al. | 361/681 |
| 2007/0103605 A1* | 5/2007 | Maruta | 348/797 |
| 2007/0215761 A1* | 9/2007 | Sawai et al. | 248/122.1 |

FOREIGN PATENT DOCUMENTS

| | | |
|---|---|---|
| JP | 2002-149082 | 5/2002 |
| JP | 2003-029643 | 1/2003 |
| JP | 2003-255851 | 9/2003 |
| JP | 2004-117874 | 4/2004 |

* cited by examiner

Prior Art

Prior Art

PLASMA TELEVISION, FLAT PANEL DISPLAY FIXING STRUCTURE, FLAT PANEL TELEVISION, AND METHOD OF ASSEMBLING FLAT PANEL TELEVISION

BACKGROUND OF THE INVENTION

1. Field of the Invention

The present invention relates to a plasma television, a flat panel display fixing structure, a flat panel television, and a method of assembling a flat panel television.

2. Description of the Prior Art

FIG. 10 shows a conventional arrangement in which a flat panel display such as a plasma display panel is fixed to prescribed supporting members.

In FIG. 10, the back side of a flat panel display 1 is shown. The flat panel display 1 is, at its back, fixed to two brackets 4 (shown in two-dot chain lines) used as supporting members. To be more concrete, each of the brackets 4 is connected to the flat panel display 1 via connecting members 3 which are fixed in an upper and a lower location on each of the left-hand and the right-hand sides of the back of the flat panel display 1. The connecting members 3 are fixed, to be apart from each other by a prescribed distance, to fixing members 2 which, each having a prescribed length and being made of plate metal, are fixed in an upper and a lower location, respectively, on the back of the flat panel display 1.

There has been a known conventional technology in which general-purpose blocks each having an inner wall surface and an outer wall surface both bent at right angles are used (for example, JP-A No. 149082/2002, hereinafter referenced as patent document one). The general-purpose blocks are compatible with different sizes of liquid crystal displays. In this technique, a liquid crystal display is supported by having a plural number of its corners held by as many of the general-purpose blocks. That is, the inner wall surface of each of the general-purpose blocks is engaged with one of the plural number of corners.

In the arrangement shown in FIG. 10, the locations where the fixing members 2 are fixed on the back of the flat panel display 1 vary with display panel manufacturers. The height of the fixing members 2 from the back of the flat panel display 1 also varies between display panel manufacturers. Furthermore, the connecting members 3 having a specific shape are factory fixed in specific locations on the fixing members 2 that differ, between flat panel display manufacturers, both in height and locations of installation. Therefore, in a case where different makes of the flat panel displays 1 are used in assembling televisions, it has been difficult to uniformize the positional relationship between the flat panel display 1 and the brackets 4.

To uniformize the positional relationship between different makes of the flat panel displays 1 and the brackets 4, it has been necessary to prepare as many types of the connecting members 3 as the number of makes of the flat panel displays 1 with each type of the connecting members 3 made to fit the shape and locations of the fixing members 2 used for a specific make of the flat panel display 1.

The general-purpose blocks disclosed in the patent document one do not adjust the positional relationship between liquid crystal displays and corresponding supporting members such as brackets used to support the liquid crystal displays.

In cases where a flat panel display is installed in a cabinet for flat panel television, as shown in FIG. 13, the flat panel display 6 is fixed to the front cabinet 15 via the prescribed connecting members 7.

A liquid crystal display fixing method according to JP-A No. 305066/2000 (hereinafter referenced as patent document two) is another conventionally known technique. In the method, brackets are fixed to a color crystal liquid display with screws, and the brackets are then fixed to a liquid crystal display base part with screws.

A still another technique is disclosed in JP-A No. 255851/2003 (hereinafter referenced as patent document three). In the technique, a display part is fixed to a front side support using an adhesive member, and engagement tabs provided in a supporting part of the front side support are engaged with a front cover.

In the conventional installation of a flat panel display, the flat panel display 6 is fixed to the front cabinet 15 via the connecting members 7 causing the weight of the flat panel display 6 to be applied to the front cabinet 15.

Similarly, in the arrangement disclosed in the patent document two, the weight of the color liquid crystal display is applied directly to the liquid crystal display base part. In the arrangement disclosed in the patent document three, the weight of the display part is applied to the front cover that is a cabinet for the device via the engagement tabs provided in the supporting part.

As described above, a problem with the conventional techniques is that the weight of a flat panel display causes a television cabinet to be subjected to a large load eventually causing the television cabinet to be deformed or otherwise become defective. There has also been another problem that a load applied to a television cabinet from the outside can be easily transmitted to a flat panel display which is a precision device accommodated in the television cabinet.

SUMMARY OF THE INVENTION

The present invention has been made in view of the above problems and an object of the present invention is to provide, at low cost, a plasma television and a flat panel display fixing structure which enable maintaining a prescribed positional relationship between a flat panel display and members for supporting the flat panel display even in a case where different makes of the flat panel displays are used.

Another object of the present invention is to provide a plasma television, a flat panel television, and a flat panel television assembly method which can prevent a cabinet from becoming defective and which can protect a flat panel display.

To achieve the former object, the present invention provides a plasma television equipped with a plasma display panel installed in a cabinet and supporting members supporting the plasma display panel at its back via prescribed connecting members. The plasma television includes the fixing members provided, to have the connecting members fixed thereto, in prescribed locations on the back of the plasma display panel. The connecting members each have a base part having an approximately rectangular plate shape and a projecting part projecting approximately perpendicularly from one side of the base part. The base part has plural first fixtures formed in plural locations for fixation to the fixing members. The projecting part has, in an end portion thereof, plural surfaces which differ in height in a direction of height of the fixing members with the plural surfaces each having a second fixture formed for fixation to one of the supporting members. The supporting members include approximately perpendicularly erected leg members and brackets which, by being connected to the leg members, support the plasma display panel at a prescribed height. The brackets each have clearance holes formed in plural portions in the vicinity of a portion to be fixed using one of the second fixtures. The plural portions include portions which oppose other surfaces protruding beyond a surface where the one of the second fixtures is formed. The clearance holes are designed to prevent the other surfaces from hitting the brackets. In this arrangement, a surface on a side where no projecting part is formed of the base part of each of the connecting members abuts on one of the fixing members and the each of the connecting members is fixed to the one of the fixing members using a prescribed one of the plural first fixtures. One of the surfaces in the end portion of the projecting part abuts on one of the brackets and is fixed to the one of the brackets using the second fixture formed on the abutting surface. This arrangement allows, even in a case where the connecting members are used being placed between plural kinds of the plasma display panels provided with the fixing members which differ, between the plural kinds of the plasma display panels, both in location on and in height from the back of the plasma display panels and the brackets, the connecting members to fix each of the plural kinds of the plasma display panels approximately at the same location relative to the brackets.

According to the present invention configured as described above, the plasma television is provided with a plasma display panel installed in a cabinet and supporting members for supporting the plasma display panel at its back via prescribed connecting members.

The connecting members are fixed to the plasma display panel via fixing members provided in prescribed locations on the back of the plasma display panel. Each of the connecting members includes a base part having an approximately rectangular plate shape and a projecting part approximately perpendicularly projecting from a side of the base part. The supporting members include approximately perpendicularly erected leg members and brackets to be connected to the leg members for supporting the plasma display panel at a position of a prescribed height.

Each of the connecting members abuts, with a surface on its side where no projecting part is formed, on one of the fixing members and is fixed to the fixing member using a prescribed one of the plural first fixtures. At the end portion of the projecting part of each of the connecting members, the connecting member has one of its surfaces abut on one of the brackets and is fixed to the bracket using a second fixture formed on the abutting surface. Namely, even when the connecting members are used being placed between plural kinds of the plasma display panels provided with the fixing members which differ, between the plural kinds of the plasma display panels, both in location on and in height from the back of the plasma display panels and the brackets, the connecting members allow prescribed ones of the first or the second fixtures to be appropriately selected for use and thereby keep the location where each of the plural kinds of the plasma display panels is fixed approximately the same relative to the brackets.

Each of the brackets has clearance holes formed in plural locations including portions which are in the vicinity of a portion to be fixed using one of the second fixtures and which oppose other surfaces protruding beyond the surface where the one of the second fixtures is formed. Therefore, even in a case where a surface in the projecting part of one of the connecting members which is not the most projecting surface in the projecting part is made to abut on one of the brackets, other surfaces more projecting than the abutting surface are prevented from hitting the bracket. The clearance holes are formed in plural locations. Therefore, even in a case where the one of the connecting members is rotated by a certain angle without changing the surface abutting on the bracket, the surfaces more projecting than the abutting surface can be prevented from hitting the bracket by using clearance holes formed in portions which, as a result of the rotation, oppose the surfaces more projecting than the abutting surface.

According to the present invention, even in a case where plural kinds of the plasma display panels are to be fixed approximately in the same location relative to the brackets, it is not necessary to prepare special connecting members and brackets for the plural kinds of the plasma display panels. Since the connecting members and the brackets can be used as common parts, the plasma televisions can be manufactured at a lower cost than in conventional cases. The effect of using common parts is common to the following inventions, too.

As described above, the present invention can provide a plasma television which, even in a case where fixing members to be used to fix a plasma display panel to brackets vary in location and height, makes it possible to standardize the location, relative to the brackets, where the plasma display panel is fixed and support the plasma display panel at a prescribed height using the brackets and the connecting members designed as common parts.

In another aspect of the present invention, an arrangement may be made such that a flat panel display fixing structure fixes a flat panel display to supporting members for supporting the flat panel display via prescribed connecting members. In the arrangement, each of the connecting members has fixtures formed in plural locations included in a portion which opposes a fixation portion of the flat panel display where the connecting member is fixed or which opposes one of the supporting members. Also in the arrangement, in a case where the connecting members are used being placed between plural kinds of the flat panel displays having the fixation portions varying, between the plural kinds of the flat panel displays, in location and height and the supporting members, each of the plural kinds of the flat panel displays is fixed approximately in the same location relative to the supporting members using the fixture provided in the portion opposing the fixation portion or in the portion opposing the one of the supporting members.

When the arrangement as described above is used, in the flat panel display fixing structure, a flat panel display is fixed to supporting members for supporting the flat panel display via prescribed connecting members.

In the arrangement, fixation portions for fixing the connecting members in prescribed locations on the flat panel display, whereas each of the connecting members has fixtures formed in plural locations in a portion to oppose the fixation portion and also in a portion to oppose one of the supporting members.

The connecting members in the above arrangement are used when connecting plural kinds of the flat panel displays having the fixation portions differing, between the plural kinds of the flat panel displays, in location and height and the supporting members. Namely, the fixtures provided in either the portions to oppose the fixation portions or the portions to oppose the supporting members are selected as required, and the flat panel displays and the supporting members are mutually connected using the selected fixtures. As a result, in a case where the connecting members are used between plural kinds of the flat panel displays and the supporting members, each of the plural kinds of the flat panel displays is fixed approximately in the same location relative to the supporting members.

In this way, it is possible to provide a flat panel display fixing structure which, even in a case where the fixation portions of the flat panel displays to be fixed to the supporting members differ, between the flat panel displays, in location and height, allows the flat panel displays to be supported in a standardized location for fixation to the supporting members by using both the supporting members and the connecting members designed as common parts.

In another aspect of the present invention, an arrangement may be made such that each of the connecting members includes a base part having an approximately rectangular plate shape and a projecting part approximately perpendicularly projecting from one side of the base part. In the arrangement, the side where no projecting part is formed of the base part abuts on the corresponding fixation portion, the projecting part has plural surfaces which differ in height in the direction of height of the fixation portion, and each of the plural surfaces has one of the fixtures formed thereon. Also in the arrangement, the supporting members are fixed using the fixtures formed on surfaces, among the plural surfaces, abutting on the supporting members, the supporting members have clearance holes formed in locations to oppose other surfaces more projecting than the abutting surfaces, and the clearance holes are designed to prevent the other surfaces from hitting the supporting members.

When the above arrangement is used, each of the connecting members includes a base part having an approximately rectangular plate shape and a projecting part approximately perpendicularly projecting from one side of the base part. In this arrangement, in a case where the connecting members are used between the flat panel display and the supporting members, the surface on the side where no projecting part is formed of the base part abuts on the fixation portion, whereas the projecting part has plural surfaces having different heights in the direction of height of the fixation portion with one of the plural surfaces abutting on the supporting member. In this arrangement, each of the plural surfaces has fixtures formed thereon and the fixture formed on the surface abutting on the supporting member is used to fix the supporting member. The supporting member has clearance holes formed in portions to oppose the other surfaces more projecting than the abutting surface, so that the other surfaces are prevented from hitting the supporting member.

Namely, according to the above arrangement, even in a case where the fixation portions differ, between the flat panel displays, in height from the flat panel displays, the distance between each of the flat panel displays and the supporting members can be kept constant with ease by selecting a prescribed surface from among the plural surfaces formed in the projecting part.

In another aspect of the present invention, the clearance holes may be formed in plural locations in the vicinity of a portion of the supporting member to be fixed using the fixture formed on the surface abutting on the supporting member.

When the above arrangement is used, the clearance holes are formed in plural locations in the vicinity of a portion, on the supporting member, to be fixed with the fixture formed on the projecting part abutting on the supporting member. Therefore, even in a case where each of the connecting members is rotated by a certain angle without changing the surface abutting on the supporting member, the surfaces more projecting than the abutting surface can be prevented from hitting the supporting member by using clearance holes formed in portions which, as a result of the rotation, oppose the surfaces more projecting than the abutting surface.

In this way, it is possible to make, as required, any of the surfaces formed in the projecting part abut on the supporting member without fail.

In another aspect of the present invention, the surface to abut on the fixation portion of each of the connecting members may be extended outwardly of the portion where the fixture is formed thereby making the area of the surface to abut on the fixation portion larger than required for fixation by use of the fixture to the fixation portion.

If only to fix a connecting member to a fixation portion, the area of abutting between the base part of the connecting member and the fixation portion may be just as large as required to fix the connecting member to the fixation portion by use of fixtures. However, in order to secure a larger area of abutting between the base part and the fixation portion, the surface to abut on the fixation portion of the base part is extended outwardly of the portion where the fixture is formed. As a result, the connecting member covers a large area of the flat panel display. A large contact area secured between the connecting member and the flat panel display can prevent twisting of the flat panel display which tends to be caused by the own weight when the flat panel display is supported by the supporting members.

In another aspect of the present invention, each of the connecting members may be provided with a fixture for fixing a prescribed member other than the supporting members to a prescribed location on the flat panel display.

The connecting members, in a case where the connecting members are used being placed between plural kinds of the flat panel displays having the fixation portions differing, between the plural kinds of the flat panel displays, in location and height and the supporting members, fix each of the plural kinds of the flat panel displays approximately in the same location relative to the supporting members. To add to the role of the connecting members, a prescribed fixture may be formed on any of the connecting members so that the connecting member may be used to fix a prescribed member other than the supporting members to a prescribed location on the flat panel display.

Fixing a prescribed member other than the supporting members to a prescribed location on the flat panel display as described above promotes effective use of the connecting members.

In another aspect of the present invention, the supporting members may include approximately vertically erected leg members and brackets which, by being connected to the leg members, support a flat panel display at a prescribed height.

In the arrangement, when a flat panel display is fixed to the brackets via the connecting members, the flat panel display is supported at a prescribed height by the supporting members each including a leg member and a bracket.

In another aspect of the present invention, the connecting members may each have a concave portion large enough to allow one of the leg members to pass through so that, when the one of the leg members and one of the brackets are connected, one end of the leg member may be guided into the concave portion.

When the bracket and the leg member are connected, one end of the leg member is guided into the concave portion allowing the leg member to be securely positioned relative to the flat panel display and the bracket.

In another aspect of the present invention, the flat panel display may be a plasma display panel.

A liquid crystal display is also among flat panel displays, but a plasma display panel is adopted as an example of flat panel display here. Then, even in a case plasma display panels manufactured by plural manufacturers are used, the positional relationship between each plasma display panel and the supporting members supporting the plasma display panel can be made approximately the same.

In this way, even in a case where the fixing members of plasma display panels to be fixed to the supporting members differ, between the plasma display panels, in location and height, each plasma display panel can be fixed and supported in a standardized location relative to the supporting members by using the supporting members and the connecting members designed as common parts.

Furthermore, in another aspect of the present invention, the first fixtures and the second fixtures may be made up of screw holes and screws to be used for fixation.

Such an arrangement makes embodiment of the present invention easy.

Next, to achieve the latter object, the present invention provides a plasma television which includes a cabinet having an approximately rectangular opening at about the center of its front wall and a plasma display panel installed in the cabinet with its display screen facing the opening. The plasma television includes brackets each of which is made of a long plate member having an upper and a lower end portions bent toward a same side of the long plate member. A tip portion of each of the upper and the lower end portions bent as described above is further bent such that the tip portion after being further bent is approximately in parallel with a portion connecting the upper and the lower end portions of the long plate member. The brackets are each connected to an approximately vertically erected leg member and support approximately the whole of the plasma television at a prescribed height. The plasma television also includes the plasma display panel connected at its back to the brackets via prescribed connecting members, a frame member which encloses the edges of the plasma display panel and which is fixed, at its portions to oppose the tip portions of the upper and the lower end portions of each of the brackets, to the brackets, and the cabinet that accommodates and is fixed to the frame member.

In the above configuration, the plasma television is provided with a cabinet having an approximately rectangular opening at about the center of its front wall and a plasma display panel installed in the cabinet with its display screen facing the opening.

In the plasma television according to the present invention, the brackets each connected to an approximately vertically erected leg member support approximately the whole of the plasma television at a prescribed height. The brackets are each made of a long plate member. An upper and a lower end portions of the long plate member are bent toward a same side thereof. A tip portion of each of the upper and the lower end portions thus bent is further bent such that the tip portion after being further bent is approximately in parallel with a portion connecting the upper and the lower end portions of the long plate member.

The plasma display panel is connected at its back to the brackets via prescribed connecting members. The frame member enclosing the edges of the plasma display panel is fixed, at its portions to oppose the tip portions of the upper and the lower end portions of each of the brackets, to the brackets. With the plasma display panel and the frame member fixed to the brackets, the cabinet accommodates the frame member and is fixed to the frame member.

In the above configuration, the weight of the cabinet and the frame member enclosed by the cabinet applies to the brackets only. The weight of the plasma display panel also applies to the brackets only. Hence, the weight of the plasma display panel applies to neither the frame member nor the cabinet. When the cabinet is subjected to a load applied from the outside, transmission of the load to the plasma display panel is maximally suppressed.

As described above, according to the present invention, the cabinet and the frame member do not apply their weight to the plasma display panel and vice versa. Hence, the present invention can provide a plasma television which can prevent the cabinet from becoming defective, for example, getting deformed and which can also prevent load transmission to the plasma display panel.

In another aspect of the present invention, a flat panel television has a cabinet and a flat panel display installed in the cabinet. The edges of the flat panel display are enclosed in a frame member. The flat panel display and the frame member are, in a state in which neither applies the own weight to the other, fixed to supporting members for supporting approximately the whole of the flat panel television. The cabinet is fixed to the frame member that is fixed to the supporting members.

In the above configuration, the flat panel television is equipped with a cabinet and a flat panel display installed in the cabinet.

In a mode of installation in the cabinet for the flat panel display according to the present invention, the flat panel display and the frame member enclosing the edges of the flat panel display are, in a state in which neither of them applies the own weight to the other, fixed to the supporting members for supporting approximately the whole of the flat panel television. The cabinet is fixed to the frame member that is fixed to the supporting members.

Namely, the weight of the cabinet and the frame member to which the cabinet is fixed applies to the supporting members only. The weight of the flat panel display also applies to the supporting members only. Hence, the weight of the plasma display panel applies to neither the frame member nor the cabinet. When the cabinet is subjected to a load such as an impact applied from the outside, transmission of the load to the flat panel display is maximally suppressed.

In the above arrangement, the cabinet and the frame member do not apply their weight to the flat panel display and vice versa. Hence, a flat panel television can be provided which can prevent the cabinet from becoming defective, for example, getting deformed and which can prevent load transmission to the flat panel display. Based on a similar concept, a flat panel television assembly method can also be provided.

In another aspect of the present invention, the supporting members may include approximately vertically erected leg members and brackets which, by being connected to the leg members, support approximately the whole of a flat panel display at a prescribed height.

In the above configuration, the supporting members include approximately vertically erected leg members and brackets which, by being connected to the leg members, support approximately the whole of the flat panel television at a height. Therefore, when the flat panel display and the frame member are fixed to the brackets respectively, neither of them applies the own weight to the other and they are both supported by the brackets at prescribed heights, respectively. Since the cabinet is fixed to the frame member, the weight of the flat panel display is not applied to the cabinet.

In this way, neither the cabinet and the frame member nor the flat panel display applies the own weight to the other, and they can all be supported at a height.

In another aspect of the present invention, the flat panel display may be connected to the supporting members via prescribed connecting members.

By using prescribed connecting members between the flat panel display and the supporting members, in a case where the cabinet is subjected to a load such as an impact, the load transmitted from the cabinet to the flat panel display can be suppressed even more than made possible. Since the flat panel display has various components such as control circuit boards, the size and the location of the area usable for the flat type display are limited. Therefore, flexibility in connecting the flat panel display and the supporting members can be increased by, rather than connecting them directly, using the connecting members between them.

In this way, transmission of a load applied to the cabinet from the outside to the flat panel display can be suppressed more strongly whereas flexibility in connecting the flat panel display and the supporting members increases.

In another aspect of the present invention, the brackets are each made of a long plate member. An upper and a lower end portions of the long plate member are bent toward a same side thereof. A tip portion of each of the upper and the lower end portions thus bent is further bent such that the tip portion after being further bent is approximately in parallel with a portion connecting the upper and the lower end portions of the long plate member. The tip portion of each of the upper and the lower end portions is used to fix the opposing portion of the frame member.

In the above configuration, the brackets are each made of a long plate member. An upper and a lower end portions of the long plate member are bent toward a same side thereof. A tip portion of each of the upper and the lower end portions thus bent is further bent such that the tip portion after being further bent is approximately in parallel with a portion connecting the upper and the lower end portions of the long plate member. The tip portion of each of the upper and the lower end portions is set to oppose the frame member enclosing the upper and the lower edges of the flat panel display and is fixed to the frame member. When the frame members are fixed to the brackets as described above, the portion connecting the upper and the lower end portions of each of the long plate members is approximately in parallel with the face of the flat panel display installed in the frame member while being apart from the face of the flat panel display by a prescribed distance. As described above, the flat panel display is provided with various components such as control circuits. The prescribed distance between the flat panel display and the brackets provides space in which such various components can be placed.

In this way, the frame member can be appropriately fixed to the brackets and space for mounting various components can be secured on the flat panel display.

In another aspect of the present invention, the flat panel display is a plasma display panel.

Generally, plasma display panels carrying various circuit boards on their back tend to be heavier than other types of flat panel displays such as liquid crystal displays. Particularly in recent years when increasingly large flat panel displays have been introduced, the effect of the own weight of a flat panel display on its cabinet cannot be ignored. In the configuration described above, even in a case where a heavy plasma display panel is used, the plasma display panel can be appropriately installed in the cabinet without causing its weight to be applied to the frame member or the cabinet. In this way, the cabinet and the frame member do not apply their weight to the plasma display panel and vice versa. As a result, the cabinet can be prevented from becoming defective, for example, getting deformed and transmission of a load to the plasma display panel can also be prevented.

DESCRIPTION OF THE PREFERRED EMBODIMENTS

Figure 1:
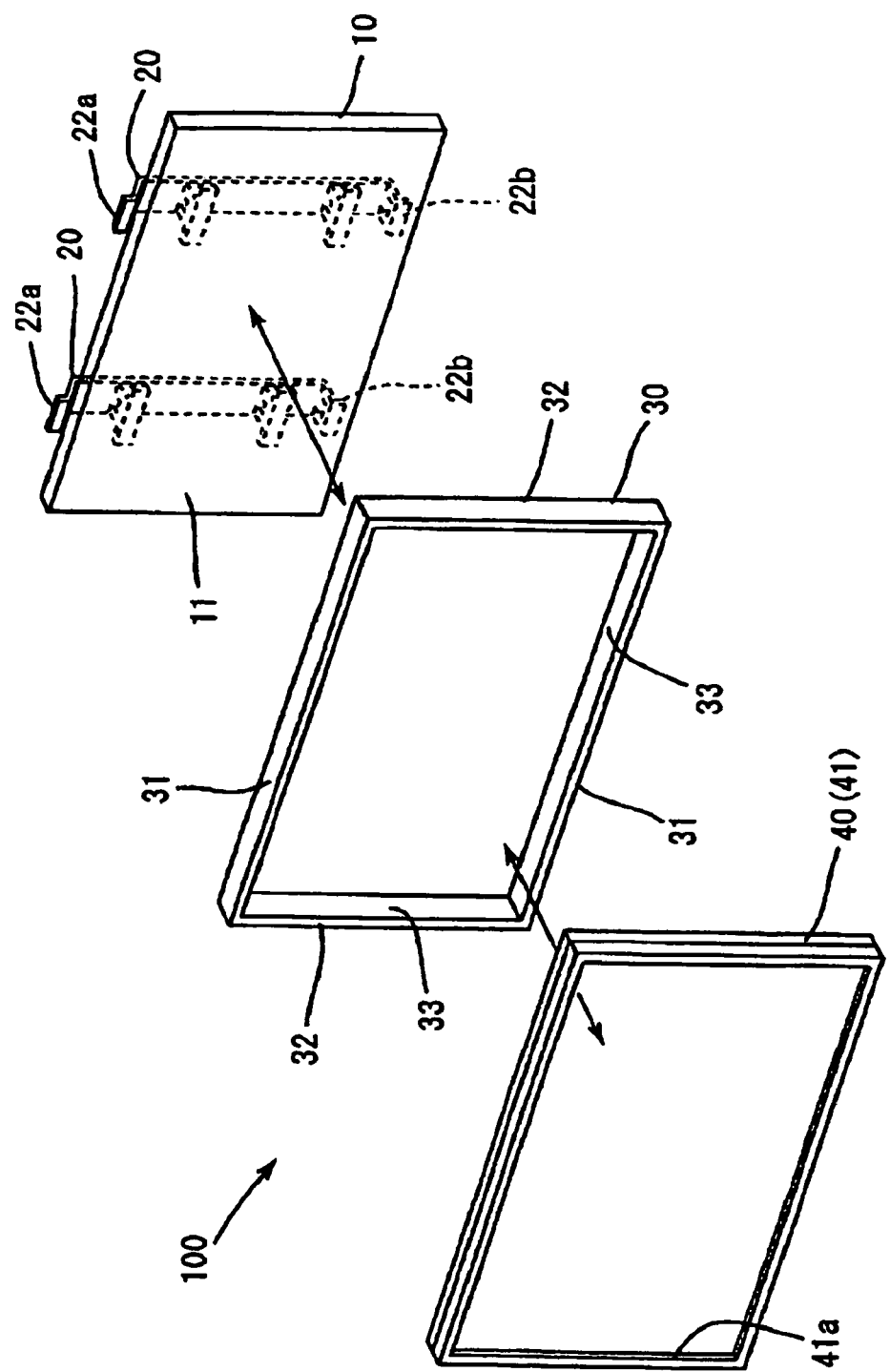
FIG. 1 is a perspective view of a plasma television assembly according to the present invention.

FIG. 1 is a perspective view of a plasma television assembly according to the present invention.

Though the mode of television assembly according to the present invention is applicable to flat-screen screen televisions in general including liquid crystal televisions, the present embodiment will be explained based on a case of assembling a plasma television.

As shown in FIG. 1, a plasma television 100 is, described roughly, an assembly of a plasma display panel (PDP) 10, a frame 30, and a cabinet 40. The cabinet 40 includes a front cabinet 41 and a rear cabinet not shown in FIG. 1. There is an opening 41a formed at about the center of the front of the front cabinet 41. The PDP 10 is installed in the cabinet 40, with a display surface 11 facing the opening 41a.

In the present embodiment, first, the PDP 10 is fixed, at prescribed locations on its back, to brackets 20. How the PDP 10 is fixed to the brackets 20 will be described later. Next, the brackets 20 holding the PDP 10 are fixed to the frame 30. As shown in FIG. 1, frame abutting surfaces 22a each made up of a top end portion of one of the brackets 20 and frame abutting surfaces 22b each made up of a bottom end portion of one of the brackets 20 are protruding beyond the top and bottom edges of the PDP 10, respectively. The PDP 10 fixed to the brackets 20 is brought into contact with the frame 30 from behind such that the frame abutting surfaces 22a and 22b abut on corresponding opposing portions of the frame 30, respectively. The frame abutting surfaces 22a and 22b and the corresponding opposing portions of the frame 30 in a mutually abutting state are mutually fixed. How to fix them is not limited to any specific method. For example, a screw hole may be produced in each of the frame abutting surfaces 22a and 22b and the corresponding opposing portions of the frame 30, and then they may be fixed together with screws using the produced screw holes.

The frame 30 includes four members. That is, the frame 30 is assembled from two transverse members 31 making up a top side and a bottom side and two side members 32 making up a left-hand side and a right-hand side. As the frame 30 is to cover the four sides of the PDP 10, the transverse members 31 and the side members 32 are designed such that the frame 30 assembled from the four members can accommodate the PDP 10. Note here that, as being described later, to prevent each of the PDP 10 and the frame 30 from applying the own weight to the other, the frame 30 is designed to be large enough to accommodate the PDP 10 without causing the four side edges of the PDP 10 to come in contact with internal surfaces 33 of the frame 30.

After the PDP 10 and the frame 30 are fixed with the brackets 20, respectively, the front cabinet 41 is fixed to the frame 30. This is done by putting the front cabinet 41 over the frame 30 from outside and fixing them to each other at plural locations. How to fix them together is not limited to any specific method. For example, screw holes may be produced in the frame 30, corresponding bosses may be formed on the front cabinet 41, and then the frame 30 and the front cabinet 41 may be fixed to each other with bolts using the screw holes and boss holes formed in the corresponding bosses. Or, engagement tabs may be formed on internal surfaces of the front cabinet 41, corresponding dents may be formed on the frame 30, and the front cabinet 41 and the frame 30 may be fixed to each other by engaging the engagement tabs with the corresponding dents. With the front cabinet 41 and the frame 30 fixed together, fixing the rear cabinet to the frame 30 from behind approximately completes assembly of the plasma television 100. In the following description, the "cabinet 40" refers to an assembly of the front cabinet 41 and the rear cabinet.

Figure 2:
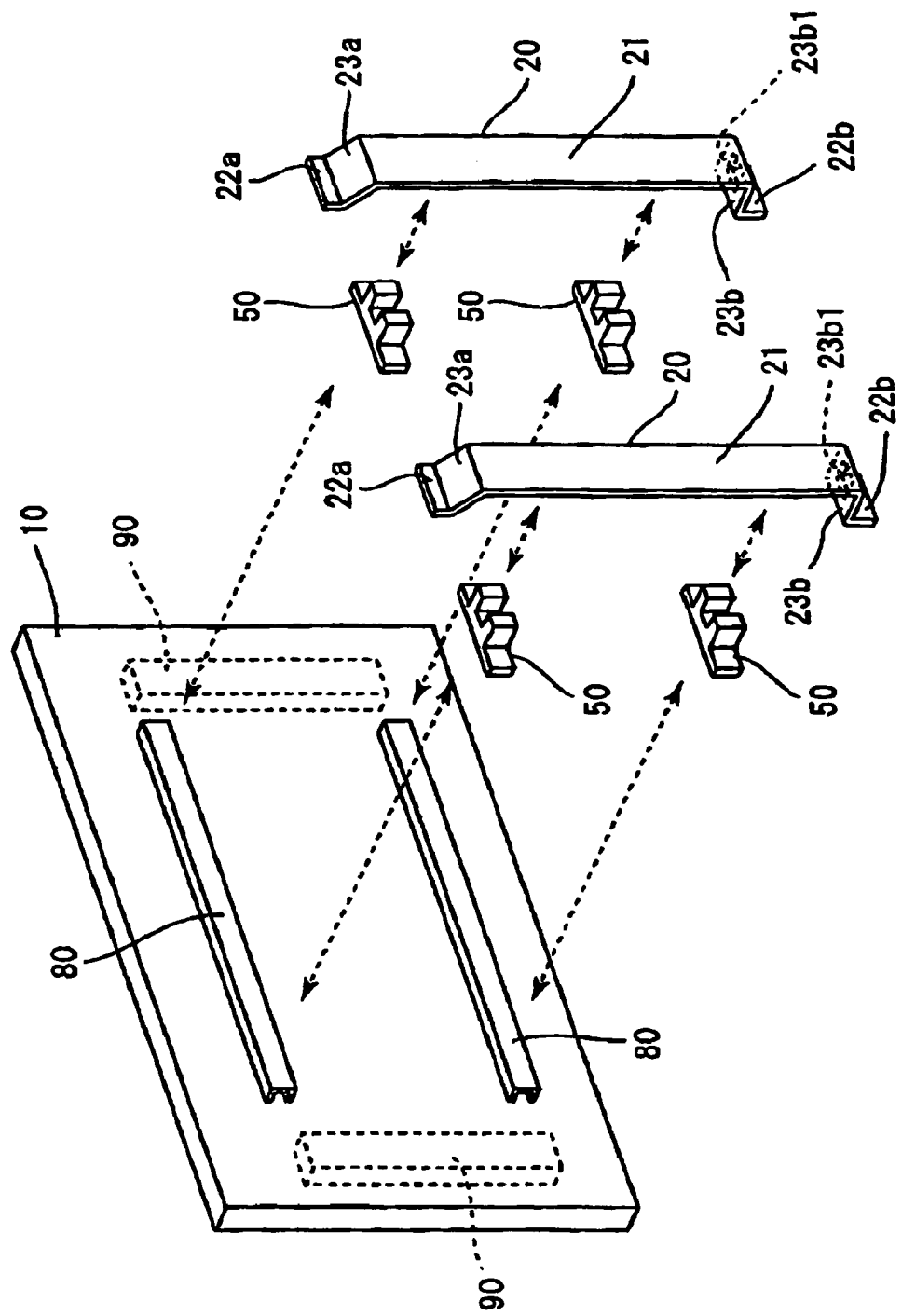
FIG. 2 is a perspective view showing how a plasma display panel and brackets are fixed.

FIG. 2 is a perspective view showing how the PDP 10 and the brackets 20 are fixed.

As shown in FIG. 2, the PDP 10 has metal fixtures 80 attached to an upper and a lower portion of its back with the longitudinal direction of the metal fixtures coinciding with the lateral direction of the PDP 10. The attachments 50 used as connecting members are fixed, each at one end, to prescribed portions of the metal fixtures 80. The brackets 20 are fixed to the other ends of the attachments 50.

The brackets 20 are each made of a long plate member bent at plural locations. To be more concrete, an upper and a lower end portions of the long plate member are bent at a prescribed angle toward a same side of the long plate member, and a tip portion of each of the upper and the lower end portions of the long plate member bent as described above is further bent such that the tip portion after being further bent is approximately in parallel with a portion connecting the upper and the lower end portions of the long plate member. The portion connecting the upper and the lower end portions of the long plate member constitutes a main part 21. The tip portion of the upper end portion of the long plate member bent to be approximately in parallel with the main part 21 constitutes a frame abutting surface 22*a*. The tip portion of the lower end portion of the long plate member bent to be approximately in parallel with the main part 21 constitutes a frame abutting surface 22*b*. The portion connecting the main part 21 and the frame abutting surface 22*a* constitutes a connecting part 23*a*, and the portion connecting the main part 21 and the frame abutting surface 22*b* constitutes a connecting part 23*b*.

Figure 3:
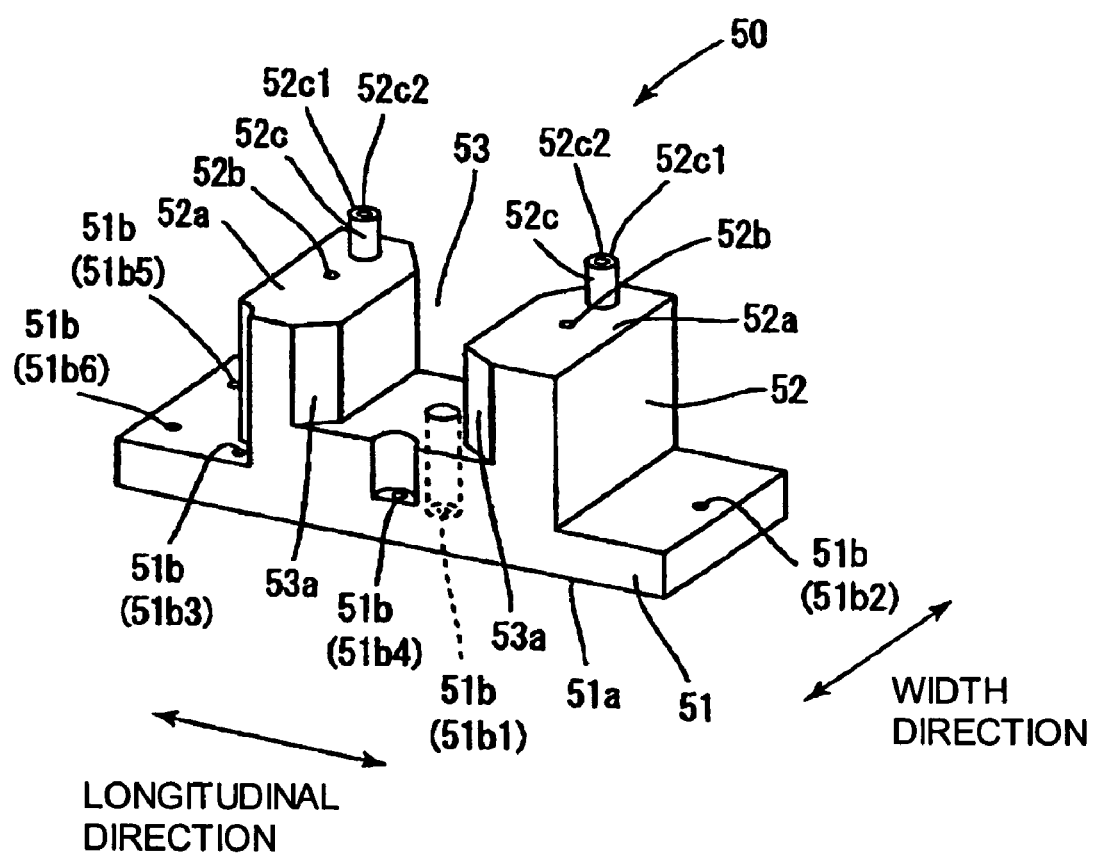
FIG. 3 is a perspective view of an attachment.
Figure 4:
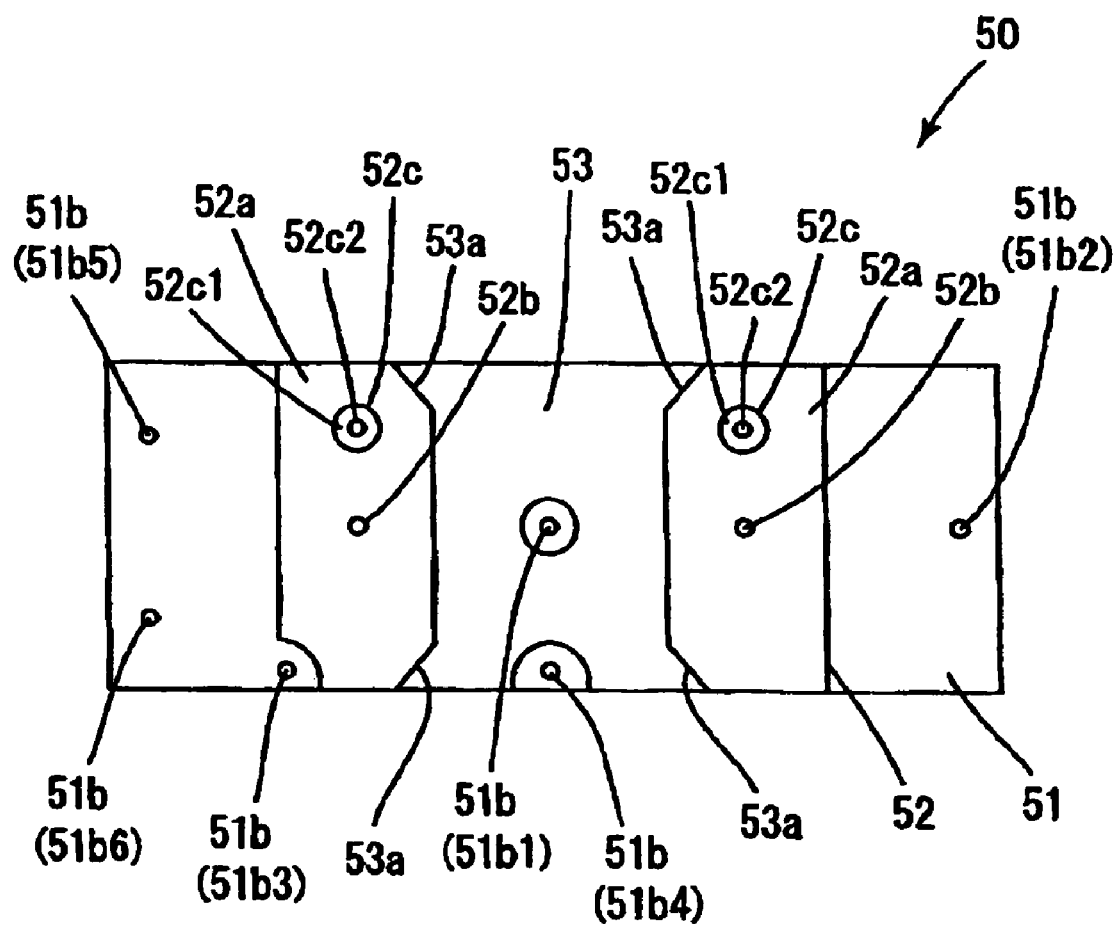
FIG. 4 is a top view of an attachment.

FIGS. 3 and 4 both show one of the attachments 50. FIG. 3 is a perspective view, and FIG. 4 is a top view.

Each of the attachments 50 is approximately made up of a base part 51 having an approximately rectangular plate shape and a projecting part 52 projecting approximately perpendicularly from one side of the base part 51. The length in the longitudinal direction of the projecting part 52 is shorter than the length in the longitudinal direction of the base part 51. The length in the width direction of the projecting part 52 is approximately identical with the length in the width direction of the base part 51. The surface on the other side that is opposite to the side where the projecting part 52 is formed of the base part 51 constitutes a panel opposing surface 51*a* used to fix the attachment 50 to the back of the PDP 10. The base part 51 has plural screw holes 51*b*.

A concave portion 53 having a prescribed depth and crossing the projecting part 52 in the width direction is formed in about the center of an upper end surface 52*a* of the projecting part 52. The upper end surface 52*a*, in about the center of which the concave portion 53 is formed, has plural screw holes 52*b* and plural bosses 52*c*. Each of the bosses 52*c* has an end face 52*c*1 at its end. The upper end surface 52*a* and the end faces 52*c*1 correspond to the surfaces cited in claims of the present invention like in "the projecting part having, in an end portion thereof, a plurality of surfaces differing in height in a direction of height of the fixing members." The screw holes 51*b* and 52*b* and boss holes 52*c*2 provided in the bosses 52*c* correspond to the fixtures cited in claims of the present invention.

In the present embodiment, two of the attachments 50 are used for each of the brackets 20. The number of the brackets 20 used is two. They are fixed to be apart from each other by a prescribed distance with their longitudinal direction coinciding with the vertical direction of the PDP 10. Hence, the attachments 50 totaling four are attached to a pair of upper and lower locations on each of the right-hand and left-hand sides of the back of the PDP 10. To be more concrete, the panel opposing surface 51*a* of each of the attachments 50 abuts on one of the metal fixtures 80 fixed to the back of the PDP 10. The attachments 50 are then screwed to the PDP 10 using the screw holes 51*b* provided in the attachments 50 and screw holes 81 provided in the metal fixtures 80. The attachments 50 are fixed such that their longitudinal direction coincides with the lateral direction of the PDP 10.

Next, the brackets 20 and the attachments 50 are fixed. Namely, the surface on the side, toward which the connecting parts 23*a* and 23*b* are bent, of the main part 21 is fixed to the two attachments 50 fixed in the upper and the lower location on the right-hand side of the back of the PDP 10. In the same manner, the other of the brackets 20 is fixed to the two attachments 50 fixed in the upper and the lower location on the left-hand side of the back of the PDP 10.

Through the above steps, the PDP 10 is fixed to the two brackets 20 via the attachments 50. The positions of the two brackets 20 fixed to the back of the PDP 10 are such that they are symmetrical about the lateral center of the PDP 10. In the present embodiment, the length in the longitudinal direction of each of the brackets 20 is approximately the same as the vertical width of the frame 30. Therefore, as described above, when the brackets 20 are fixed to the PDP 10, the frame abutting surfaces 22*a* and 22*b* protrude beyond the upper and the lower edges of the PDP 10, respectively.

In assembling the plasma television 100, there are cases where the PDPs 10 to be accommodated in the cabinets 40 are acquired from a same manufacturer and also cases where plural kinds of the PDPs 10 are acquired from plural manufacturers. When the PDPs 10 acquired from plural manufacturers are used, the metal fixtures 80 fixed to the back of the PDP 10 vary between manufacturers, for example, in location and in height from the back surface of the PDPs 10.

In the present embodiment, even in a case where the PDPs 10 acquired from plural manufacturers are used, the positional relationship between the PDPs 10 and the brackets 20 is fixed using the attachments 50 and the brackets 20.

Figure 5:
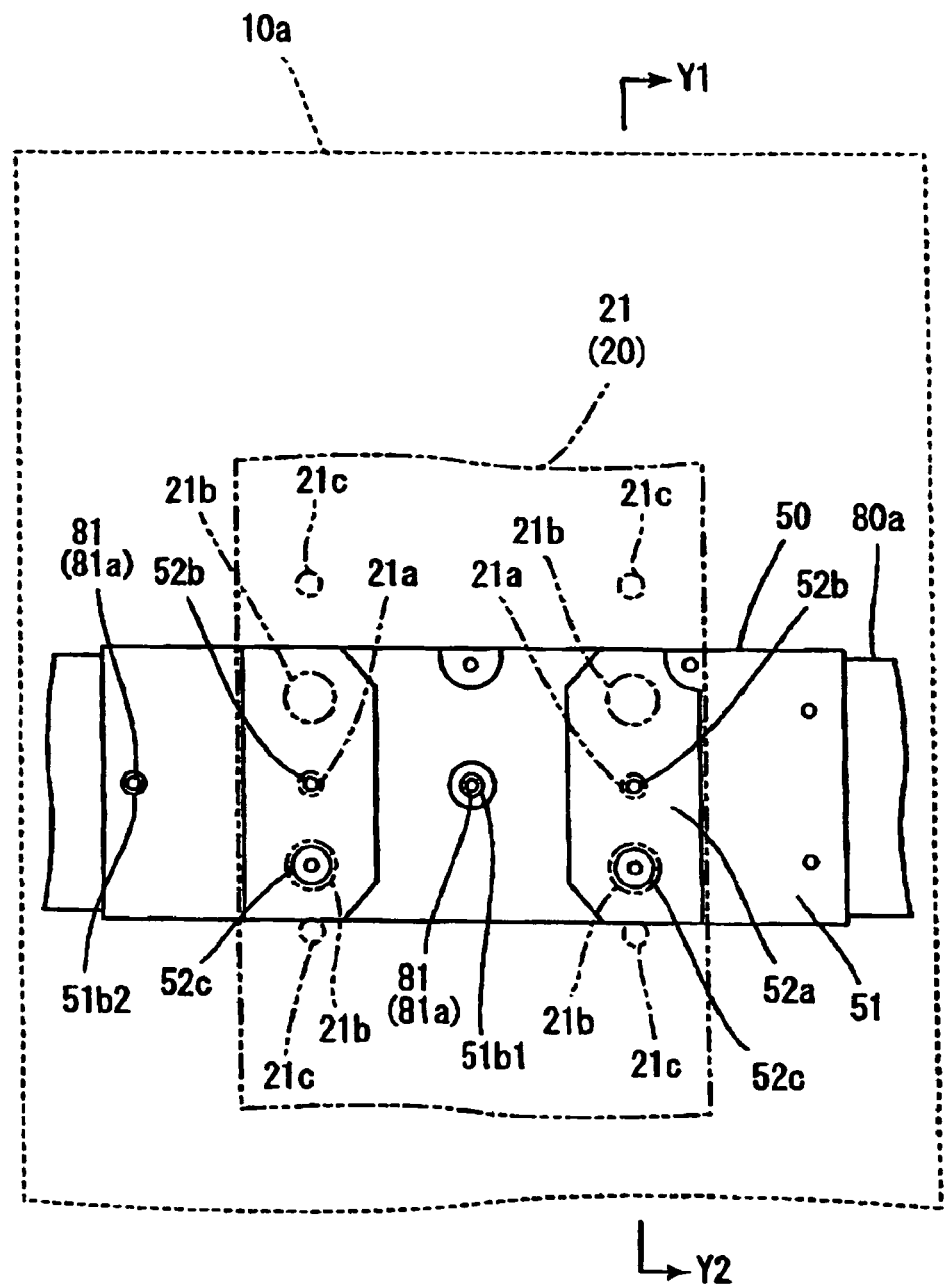
FIG. 5 is a partial rear view of the back of a plasma display panel.

FIG. 5 shows a portion of the back of a PDP 10*a*. The portion includes one of the attachments 50 which is fixed in an upper right location, as viewed facing the back of the PDP 10*a*, on the back of the PDP 10*a* and one of the brackets 20 which is fixed to the one of the attachments 50. The bracket 20 in FIG. 5 is shown in two-dot chain lines.

Figure 6:
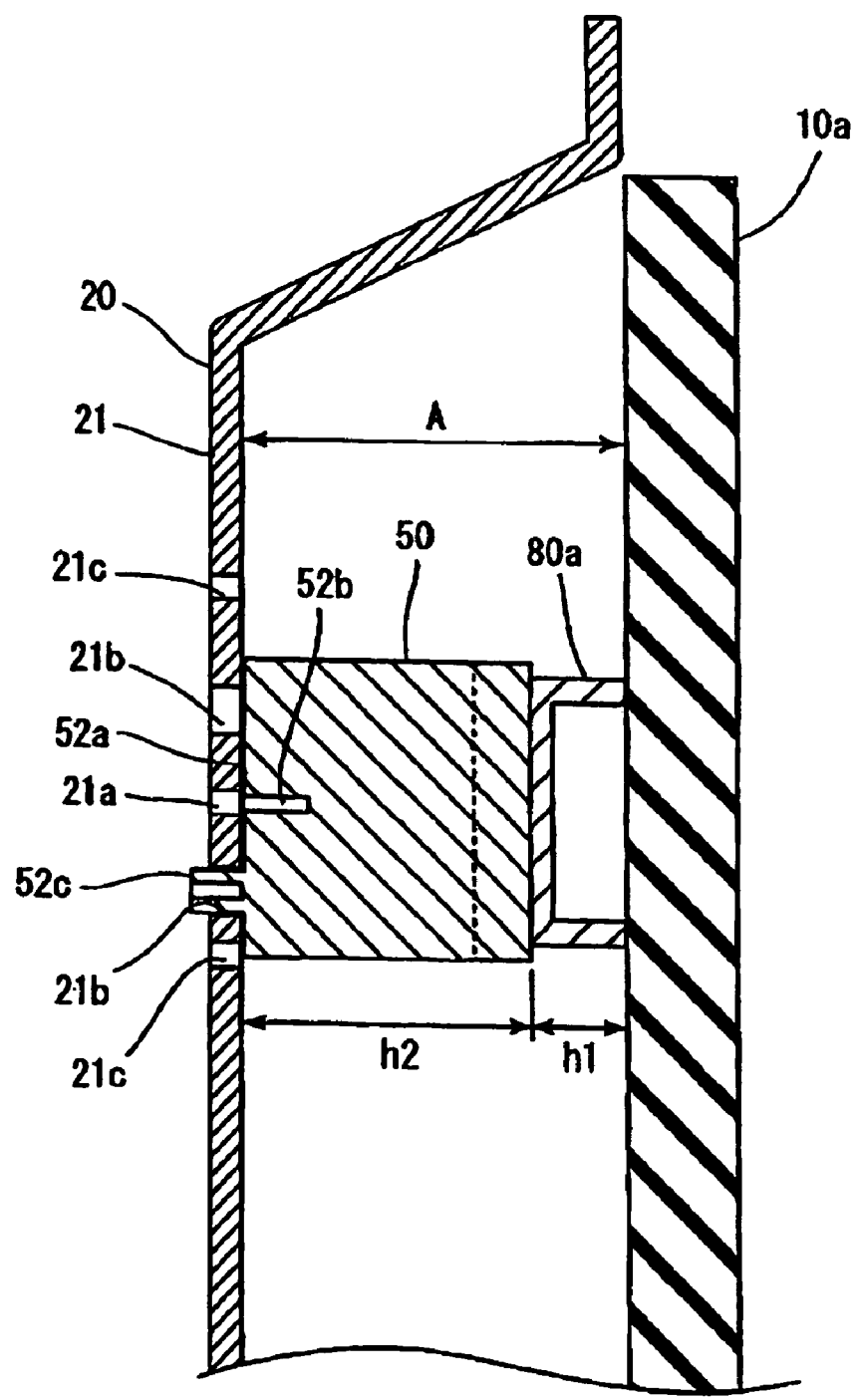
FIG. 6 is a partial sectional side elevation of a plasma display panel.

FIG. 6 is a sectional side elevation (taken along line Y1-Y2 of FIG. 5) of the PDP 10*a* and one of the brackets 20 that are fixed to each other via one of the attachments 50. The attachment 50 shown in FIGS. 5 to 8 is the one fixed in an upper right location on the back of the PDP 10*a* or of a PDP 10*b*. In a lower right location on the back of the PDP 10*a* and the PDP 10*b*, another of the attachments 50 is fixed in the same manner as the attachment 50 fixed in the upper right location. Still another one each of the attachments 50 is fixed in an upper left location and a lower left location on the back of the PDP 10*a* and the PDP 10*b*. The two attachments 50 fixed on each of the right-hand and the left-hand sides on the back of the PDP 10*a* and the PDP 10*b* are arranged to be laterally symmetrical.

The locations of the metal fixtures 80*a* on the back of the PDP 10*a* and locations of screw holes 81*a* used to fix the attachments 50 to the metal fixtures 80*a* depend on panel manufacturer's specifications. In the arrangement shown in FIG. 5, the attachment 50 is fixed using the screw holes 81*a* formed in the metal fixture 80*a* and corresponding screw holes 51*b*1 and 51*b*2 among the screw holes 51*b* formed in the base part 51.

In FIG. 6, the height of the metal fixture 80*a* measured from the back of the PDP 10*a* is denoted as h1. The value of h1 is unique to the PDP 10*a*. In the present invention, regardless of the make of the PDP 10, the distance A between the PDP 10 and the bracket 20 is kept constant. The upper end surface 52*a* of the attachment 50 abuts on a prescribed location on the main part 21 of the bracket 20. That is, a height h2 from the panel opposing surface 51*a* to the upper end surface 52*a* of the attachment 50 is determined such that the sum of the heights h1 and h2 equals the constant distance A.

The attachment 50 with the upper end surface 52*a* abutting on the main part 21 and the bracket 20 are fixed to each other using the screw holes 52*b* provided in the attachment 50 and corresponding screw holes 21*a* provided in the main part 21. The main part 21 has clearance holes 21*b* in locations opposing the locations of the bosses 52*c* formed on the upper end surface 52*a* of the attachment 50 so that, when the upper end surface 52*a* abuts on the main part 21 of the bracket 20, the bosses 52*c* formed on the upper end surface 52*a* fit through the clearance holes 21*b* to prevent the bosses 52*c* from hitting the main part 21.

Figure 7:
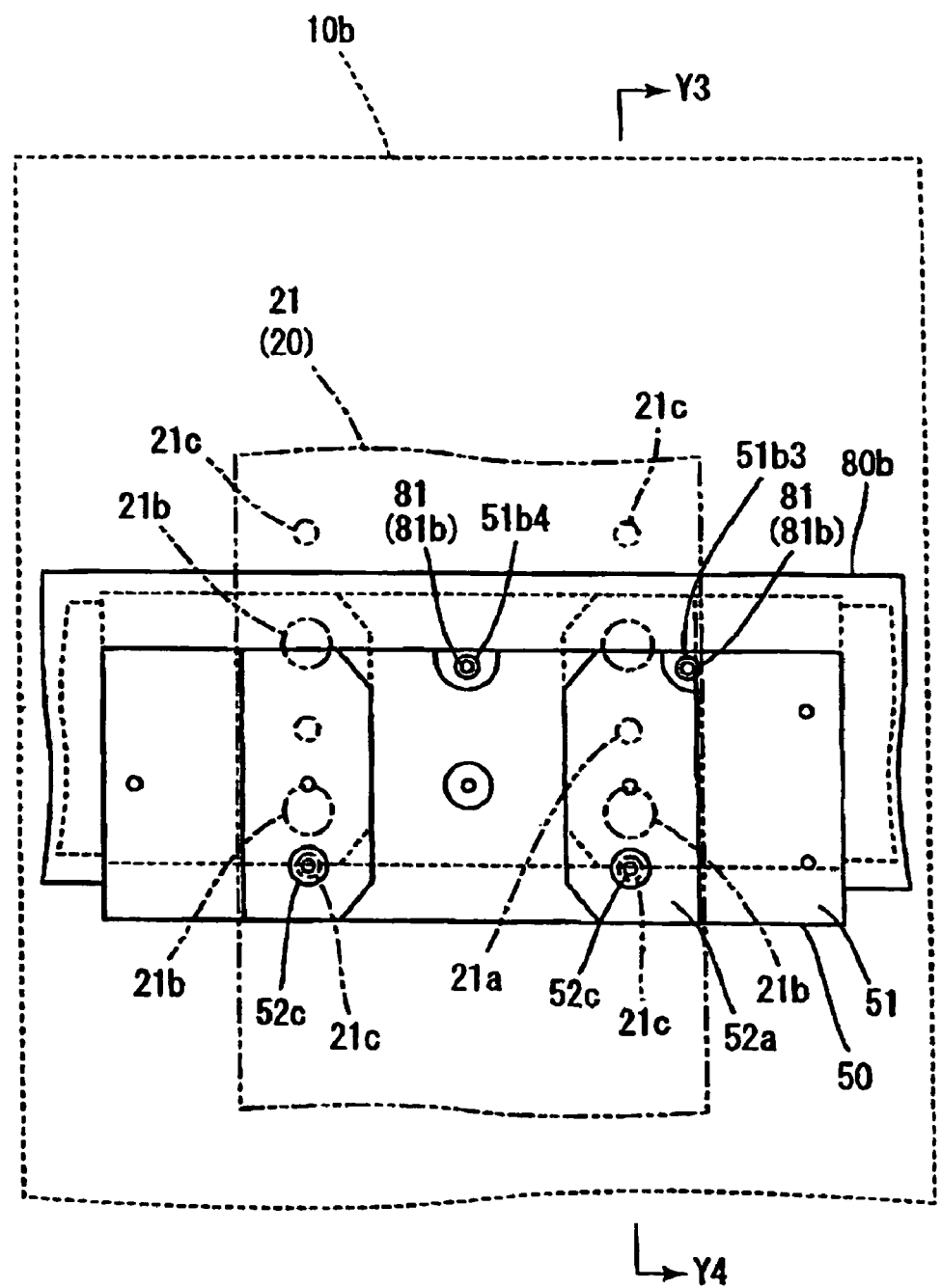
FIG. 7 is a partial rear view of the back of a plasma display panel.
Figure 8:
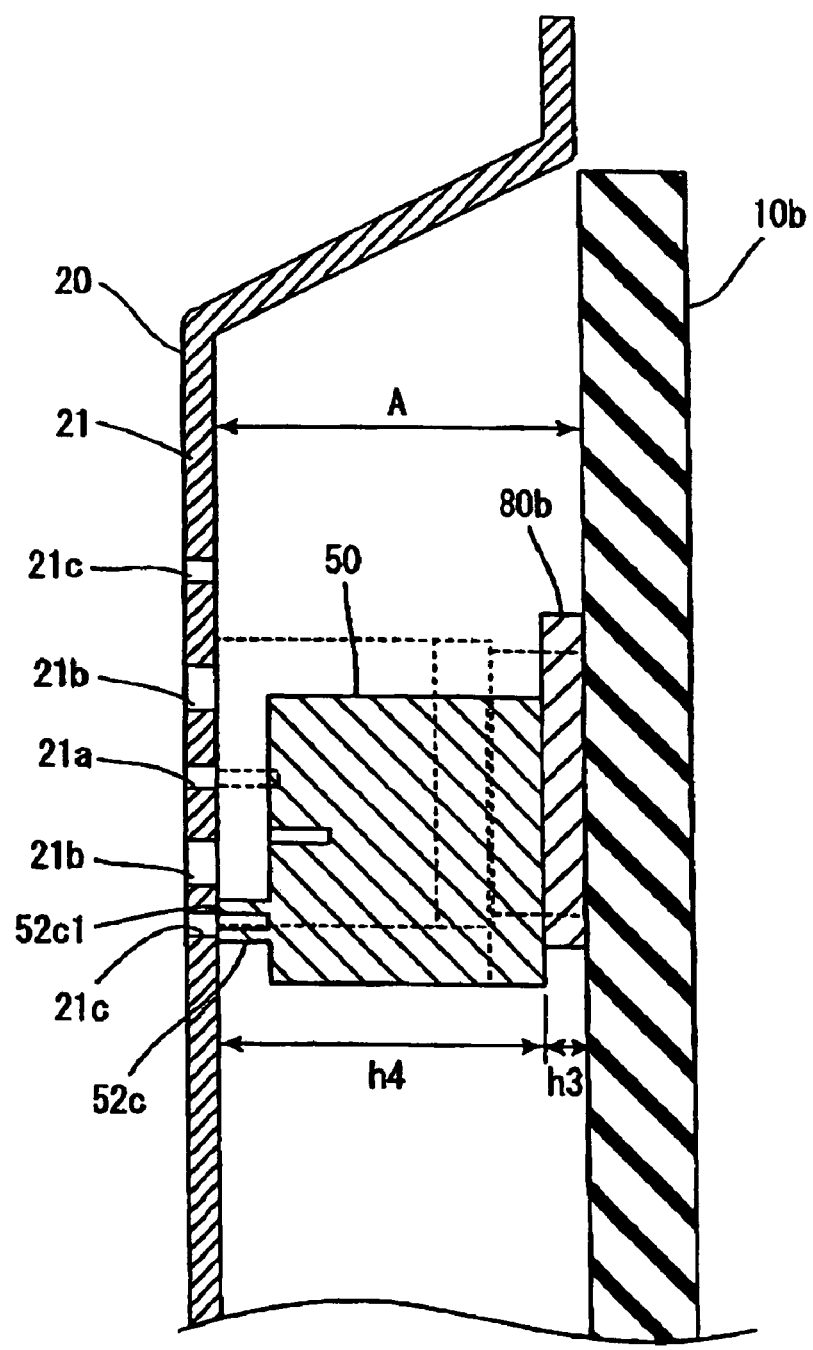
FIG. 8 is a partial sectional side elevation of a plasma display panel.

FIG. 7 shows a portion of the arrangement on the back of the PDP 10*b*. FIG. 8 is a sectional side elevation (taken along line Y3-Y4 of FIG. 7) of the PDP 10*b* and one of the brackets 20 that are fixed to each other via one of the attachments 50.

The PDP 10*b* is of the same size as the PDP 10*a*, but the two are products of different manufacturers. In these figures, the positions of the metal fixture 80*a* and the attachment 50 used for the PDP 10*a* are shown in broken lines for comparison purposes.

For the PDP 10*b*, the attachment 50 and the metal fixture 80*b* are fixed to each other using screw holes 81*b* provided in the metal fixture 80*b* and prescribed screw holes 51*b*3 and 51*b*4, which correspond to the screw holes 81*b*, among the screw holes 51*b* provided in the base part 51 of the attachment 50.

As shown in these figures, the locations of the metal fixture 80*a* on the back of the PDP 10*a* and the locations of the screw holes 81*a* provided in the metal fixture 80*a* for the PDP 10*a* are completely different from the locations of the metal fixture 80*b* on the back of the PDP 10*b* and the locations of the screw holes 81*b* provided in the metal fixture 80*b* for the PDP 10B. However, the lateral position of the attachment 50 does not change whether it is fixed to the metal fixture 80*a* on the back of the PDP 10*a* or fixed to the metal fixture 80*b* on the back of the PDP 10*b*. With such an arrangement made, the lateral distance between the attachments 50 fixed on the left-hand and the right-hand sides on the back of the PDP 10*a* is approximately the same as the lateral distance between the attachments 50 fixed on the left-hand and the right-hand sides on the back of the PDP 10*b*.

The height measured from the back of the PDP 10*b* of the metal fixture 80*b* is denoted as h3. The h1 is shorter than the h1. When the attachment 50 is fixed to the metal fixture 80*b* that is shorter than the metal fixture 80*a*, the end faces 52*c*1, not the upper end surface 52*a*, of the bosses 52*c* abut on the main part 21. That is, to keep the constant distance A between the PDP 10*b* and the bracket 20, the height h4 from the panel opposing surface 51*a* to the end faces 52*c*1 of the attachment 50 is determined such that the sum of the heights h3 and h4 equals the distance A.

The attachment 50 with the end faces 52*c*1 abutting on the main part 21 and the bracket 20 are fixed to each other using the bosses 52*c* (boss holes 52*c*2) formed on the attachment 50 and the screw holes 21*c* provided in the main part 21. When the vertical position of the bracket 20 for the PDP 10*b* is as shown in FIGS. 5 and 6, the screw holes 21*c* are produced in locations on the main part 21 that oppose the locations of the bosses 52*c* (boss holes 52*c*2) formed on the attachment 50. With such an arrangement made, the positional relationship between the bracket 20 and the PDP 10*a* and that between the bracket 20 and the PDP 10*b* become approximately the same.

As described above, when using the PDP 10*a* and the PDP 10*b* of a same size to be fixed to the brackets 20, the distance between the brackets 20 and the PDP 10*a*, the distance between the brackets 20 and the PDP 10*b*, the vertical position of the PDP 10*a* relative to the brackets 20, and the vertical position of the PDP 10*b* relative to the brackets 20 can be made approximately constant by appropriately determining the location of each of the attachments 50 and selecting appropriate fixtures to be used, regardless of the specifications of the metal fixtures 80*a* and 80*b* being used. Since, as being described later, the distance between the two brackets 20 on the back of the PDP 10*a* and the PDP 10*b* is approximately constant, the distance between leg members 60 connected to the brackets 20 is approximately the same between the PDP 10*a* and the PDP 10*b*. Furthermore, using the attachments 50 and the brackets 20 makes it unnecessary to separately prepare special connecting members and leg members to support the PDP 10*a* and the PDP 10*b*. Namely, by using the attachments 50 and the brackets 20 as common parts, the positions relative to the brackets 20 of the PDP 10*a* and the PDP 10*b* fixed to the brackets 20 can be standardized. As a result, the production cost of the plasma television 100 can be substantially suppressed.

The attachments 50 used to fix the metal fixtures 80 and the brackets 20 may also be used to fix other members. For example, the attachments 50 may be used to fix shield boxes 90 which shield circuit boards installed in prescribed locations on both sides of the back of the PDP 10. As shown in FIG. 2, the shield boxes 90 are fixed in spaces outside the area between the left-hand and the right-hand brackets 20, respectively. That is, one of the shield boxes 90 is installed in a space to the right of the right-hand bracket and the other of the shield boxes 90 is installed in a space to the left of the left-hand bracket. To enable such installation, screw holes 51*b*5 and 51*b*6 are produced in a side area of the base part 51 of each of the attachments 50. It is then possible to fix the shield boxes 90 in the spaces outside the area between the left-hand and the right-hand brackets 20 using the screw holes 51*b*5 and 51*b*6 and screw holes or the like produced in the shield boxes 90.

When fixing one of the attachments 50 on the right-hand side of the back of the PDP 10, it is necessary to position the attachment 50 so that the side area where the screw holes 51b5 and 51b6 are formed of the base part 51 comes on the right. When fixing the attachment 50 on the left-hand side of the back of the PDP 10, it is necessary to position the attachment 50 so that the side area of the base part 51 comes on the left. That is, depending on whether the attachment 50 is fixed on the left-hand side or on the right-hand side of the back of the PDP 10, it is necessary to reverse the sides of the attachment 50. To make it possible to reverse the sides of the attachment 50, the following measures are incorporated in the bracket 20 to be connected with the attachment 50.

As shown in FIGS. 5 to 8, the main part 21 of the bracket 20 has the clearance holes 21b above and below the screw holes 21a. In FIGS. 5 and 6, the bosses 52c are shown fitting through the lower-tier clearance holes 21b below the screw holes 21a. In a case where the attachment 50 is fixed on the left-hand side of the back of the PDP 10a, the sides of the attachment 50 are reversed with the bosses 52 coming upward of the screw holes 52b. To cope with the condition, the clearance holes 21b are provided both above and below the screw holes 21a. With such an arrangement made, when the attachment 50 is fixed on the left-hand side of the back of the PDP 10a, the bosses 52c fit through the clearance holes 21b above the screw holes 21a, whereas the positional relationship between the attachment 50 and the metal fixture 80a as well as between the attachment 50 and the bracket 20 is kept the same as when the attachment 50 is fixed on the right-hand side of the back of the PDP 10a.

The main part 21 of the bracket 20 has the screw holes 21c formed at different vertical levels. In the arrangement shown in FIGS. 7 and 8, the bracket 20 and the attachment 50 are fixed to each other using the lower-positioned screw holes 21c and the bosses 52c. When the attachment is fixed on the left-hand side of the back of the PDP 10b, the sides of the attachment 50 are reversed. Therefore, even if the attachment 50 and the metal fixture 80b are fixed to each other in the same positional relationship as when they are used on the right-hand side of the back of the PDP 10b, the portions of the main part 21 on which the end faces 52c1 of the bosses 52c abut are different from when the attachment 50 and the metal fixture 80b are used on the right-hand side of the back of the PDP 10b. To cope with the condition, when used on the left-hand side of the back of the PDP 10b, the bracket 20 and the attachment 50 are fixed to each other using the upper positioned screw holes 21c and the bosses 52c. With such an arrangement made, even when the portions of the main part 21 on which the end faces 52c1 of the bosses 52c abut on differ between the left-hand and the right-hand sides of the back of the PDP 10b, the vertical positional relationship between the PDP 10b and the bracket 20 is kept approximately the same between the two sides of the back of the PDP 10b.

According to the present invention, by using the arrangements as described above, the brackets 20 and the attachments 50 can be made common parts for the PDP 10a and the PDP 10b, which can be used whether on the left-hand side or on the right-hand side of the back of the PDP 10a or the PDP 10b.

The weight of the PDP 10 is applied only to the brackets 20 via the attachments 50, so that the brackets 20 bear a considerable weight. When contact areas between the metal fixtures 80 and the attachments 50 are small, a slight torsion can be caused in the surface plane of the PDP 10. Such a torsion is not desirable for a precision apparatus like the PDP 10. As a countermeasure, the contact areas between the panel opposing surfaces 51a of the attachments 50 and the metal fixtures 80a or 80b may be enlarged so as to allow the attachments 50 to support the PDP 10 from its back via larger areas. For example, the length in the longitudinal direction of the panel opposing surface of each of the attachments 50 may be increased to secure an adequate contact area, which is larger than required to fix the attachments 50 and the metal fixtures 80, between the panel opposing surface 51a of each of the attachments 50 and the corresponding one of the metal fixtures 80.

Particularly, when a lateral distance between the attachments 50 fixed on the left-hand and the right-hand sides of the back of the PDP 10 is excessively large, the PDP 10 tends to be twisted, by its own weight, in its part between the locations of the attachments 50 fixed on the left-hand and the right-hand sides of its back. Such twisting of the PDP 10 attributable to an excessively large lateral distance between the attachments 50 fixed on both sides of the back of the PDP 10 can be prevented by securing an adequate contact area with an adequate lateral length between the panel opposing surface 51a of each of the attachments 50 and the corresponding one of the metal fixtures 80.

Figure 9:
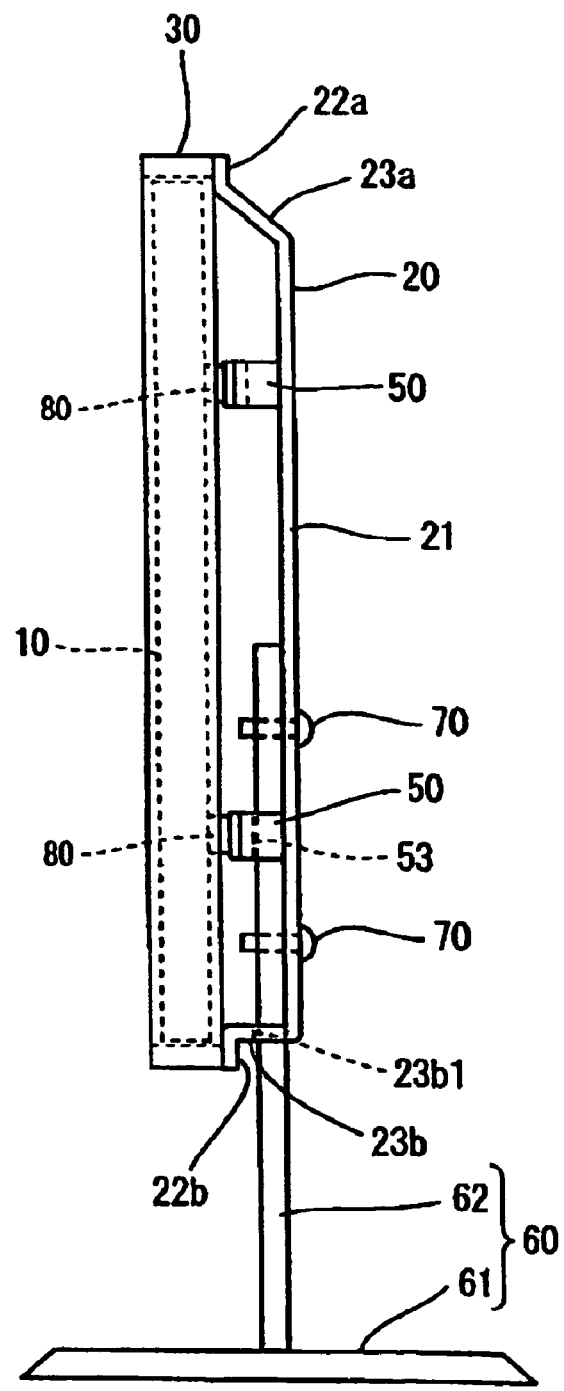
FIG. 9 is a side view showing a bracket supporting a plasma display panel and a frame.
Figure 10:
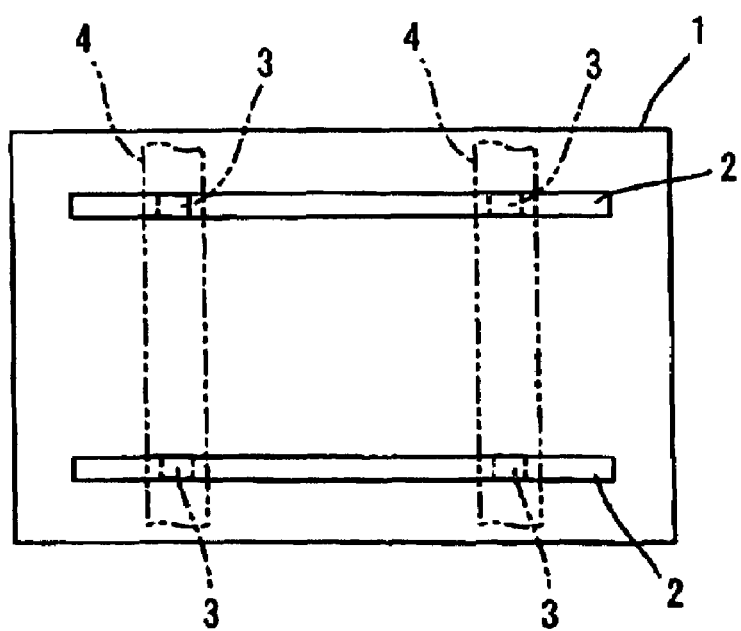
FIG. 10 is a diagram for explaining a conventional arrangement in which a flat panel display is fixed to prescribed supporting members.

FIG. 9 is an approximate side view of one of the brackets 20 supporting the PDP 10 and the frame 30. In FIG. 9, the shield boxes 90 and the cabinet 40 fixed to the frame 30 are omitted.

As described in the foregoing, the PDP 10 is fixed to the brackets 20 via the attachments 50, and the frame 30 is fixed to the brackets 20 via the frame abutting surfaces 22a and 22b of the brackets 20. According to the present invention, whichever of the PDP 10a or the PDP 10b is used as the PDP 10, the positional relationship between the brackets 20 and the PDP 10a or the PDP 10b is kept approximately the same. Therefore, the frame abutting surfaces 22a and 22b included in upper and lower end portions of each of the brackets 20 protrude beyond the upper and the lower edges of whichever of the PDP 10a and the PDP 10b is used approximately at the same locations of the upper and the lower edges and approximately by the same length. According to the present invention, therefore, the frame 30 to be fixed to the brackets 20 can also be made a common part for the PDP 10a and the PDP 10b.

Furthermore, as long as the frame 30 is a common part, the cabinet 40 to be accommodated in and fixed to the frame 30 can also be made a common part for the PDP 10a and the PDP 10b.

With regard to the bracket 20 as shown in FIG. 9, the frame abutting surfaces 22a and 22b used to fix the frame 30 are approximately in a same plane as the backs of the frame 30 and the PDP 10, but the main part 21 is apart from the back of the PDP 10 by a prescribed distance. In this arrangement, a certain amount of space is secured between the back of the PDP 10 and the main part 21. It is necessary to secure a certain amount of space on the back of the PDP 10 to allow installation of circuit boards such as a control circuit and a power supply circuit and various electronic components. Therefore, the bracket 20 as described above may be said to have an optimum shape to fix, at its upper and lower end portions, the frame 30 while also fixing the PDP 10 that is accommodated in the frame 30 and that carries on its back various circuit boards and electronic components.

The bracket 20 is connected in its lower portion to a leg member 60. The leg member 60 includes a base 61 and a leg 62 which is approximately perpendicularly erected from the base 61 and connected to the bracket 20. The bracket 20 and the leg 62 can be connected in various ways. In the present embodiment, they are connected as follows.

A through hole 23b1 which is large enough to allow the leg 62 to pass through is formed in the connecting part 23b connecting the main part 21 and the frame abutting surface 22b. The concave portion 53 of the attachment 50 is designed to be large enough to allow the leg 62 to pass through. That is, besides the attachment 50 positioned between the PDP 10 and the bracket 20 fixes both the PDP 10 and the bracket 20, it also serves to position the leg 62 that supports the plasma television 100 by allowing the leg 62 to pass through the concave portion 53. Also, as shown in FIGS. 3 and 4, the concave portion 53 is beveled, forming bevels 53a, where it ends at each side of the projecting part 52, with the bevels 53a making the concave portion 53 wider at its parts closer to each side of the projecting part 52. When the leg 62 is passed through the concave portion 53, the bevels 53a serving as a guide allow the leg 62 to proceed smoothly.

The leg 62 is passed through the through hole 23b1 and the concave portion 53, and then mutually opposing surfaces of the leg 62 and the main part 21 of the bracket 20 are tightly fixed to each other with screws 70. Each of the brackets 20 and each of the leg members 60 are thus combined into one structure and the combined structures thus obtained almost entirely support the plasma television 100 inclusive of the PDP 10, the frame 30, and the cabinet 40 at a prescribed height.

As described above, the PDP 10 and the frame 30 are separately supported at prescribed heights from an installation surface by the brackets 20, each of which has been combined with one of the leg members 60 into one structure and which support the whole apparatus. The frame 30 enclosing the periphery of the PDP 10 is not in contact with the PDP 10. In this arrangement, neither of the PDP 10 and the frame 30 applies its weight to the other. The cabinet 40 is fixed to the frame 30. Therefore, between the cabinet 40 and the PDP 10, neither applies its weight to the other.

In the way described above, the cabinet 40 is not subjected to the weight of the PDP 10, that is, an unwanted load. Therefore, a problem of the cabinet 40 being made defective, for example, getting deformed due to the weight of the PDP 10 can be prevented. As described above, the PDP 10 carries various circuit boards and electronic components on its back, usually making its total weight greater than that of a flat panel television of a different type, for example, a liquid crystal television. Particularly, in a case where a large-size model of the PDP 10 is used, if the weight of the PDP 10 is allowed to be applied to the cabinet 40, the cabinet 40 is greatly affected. Therefore, applying the configuration according to the present invention to large-sized plasma televisions is very effective in protecting the cabinet 40.

It can be said that the configuration in which neither of the cabinet 40 and the PDP 10 applies the own weight to the other is also suitable for protecting the PDP 10. In the configuration, even when the cabinet 40 is subjected to an external impact, the load resulting from the impact is mostly absorbed by the brackets 20 before being conveyed to the PDP 10. In the present embodiment, the attachments 50 exist between the PDP 10 and the brackets 20, so that the attachments 50 also absorb the impact. As a result, propagation of the impact received by the PDP 10 is maximally prevented and the PDP 10 that is a precision apparatus is effectively protected from the external impact.

The present embodiment also has the following effects.

Conventionally, there have been cases where flat panel displays like the PDP 10 are fixed to the front cabinet 41. In such a situation, to work on a flat panel display like the PDP 10, for example, in a component fitting process or in an adjustment process, they fix the flat panel display to the front cabinet 41 to have the device supported. When a flat panel display fixed to the front cabinet 41 is made go through production processes, the front cabinet 41 is subjected to various impacts and loads, both human-induced and accidental. It then occurs that the flat panel display is judged defective due to, for example, flaws or deformity found on or in the front cabinet 41 in final inspection before shipment.

In the present embodiment, the brackets 20 each combined with one of the leg members 60 into a single structure fix the PDP 10 and the frame 30. By making the PDP 10 and the frame 30 both supported by the leg members 60 and the brackets 20 go through various processes, all installation and maintenance processes for devices to be accommodated in the cabinet 40 can be finished without requiring the cabinet 40 to be installed. Since the cabinet 40 is required to be installed only in a final stage of an assembly line, it has almost no chances to be subjected to an unwanted load or impact. As a result, the incidence of the product being judged defective due to flaws or deformity found on or in the cabinet 40 is greatly reduced compared with when the conventional method is used.

As described in the foregoing, each of the attachments 50 serves, with its base part 51, as a fixture for fixation to one of the metal fixtures 80a or 80b, whereas its projecting part 52 has, on its side to oppose one of the brackets 20, two surfaces which differ in height by an amount corresponding to the difference in height between the metal fixtures 80a and 80b with a fixture formed in each of the two surfaces. Each of the brackets 20 has the screw holes 21a and 21c and the clearance holes 21b. The holes are formed in portions to oppose, based on a precondition that the vertical position relative to the PDP 10a or 10b of the bracket 20 is constant, the corresponding attachments 50 fixed to the metal fixtures 80a or 80b. Using the attachments 50 and the brackets 20 designed as common parts, the PDP 10a and the PDP 10b provided with the metal fixtures 80 differing in position and/or shape can be fixed in approximately standardized locations relative to the brackets 20.

Figure 11:
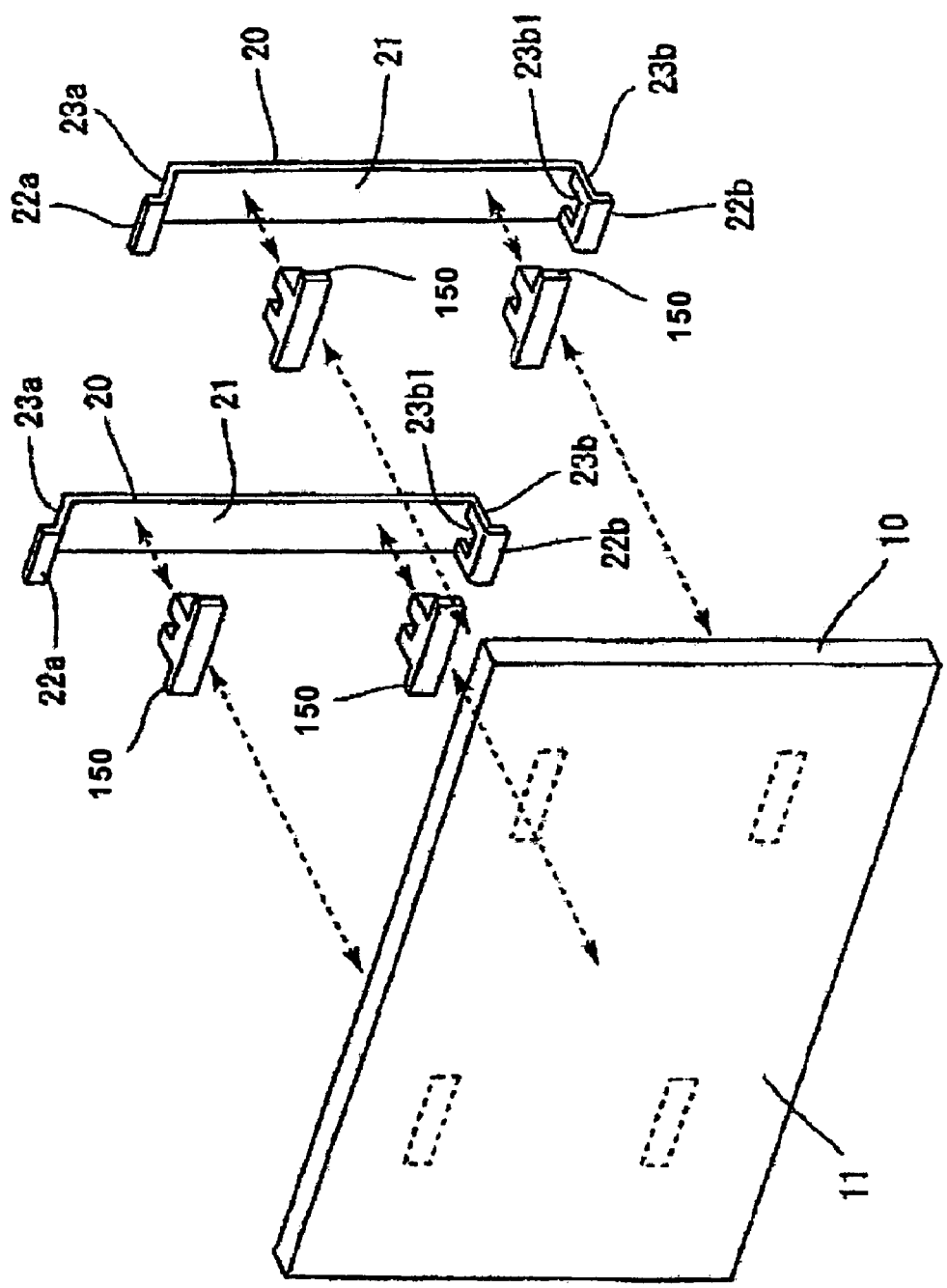
FIG. 11 is a perspective view showing how a plasma display panel is fixed to brackets.

FIG. 11 is a perspective view showing how the PDP 10 and the brackets 20 are fixed.

As described above, the PDP 10 is fixed, at its back, to the brackets 20. In the present embodiment, the PDP 10 is fixed to the brackets 20 via the attachments 150 used as connecting members without coming into direct contact with the brackets 20.

Figure 12:
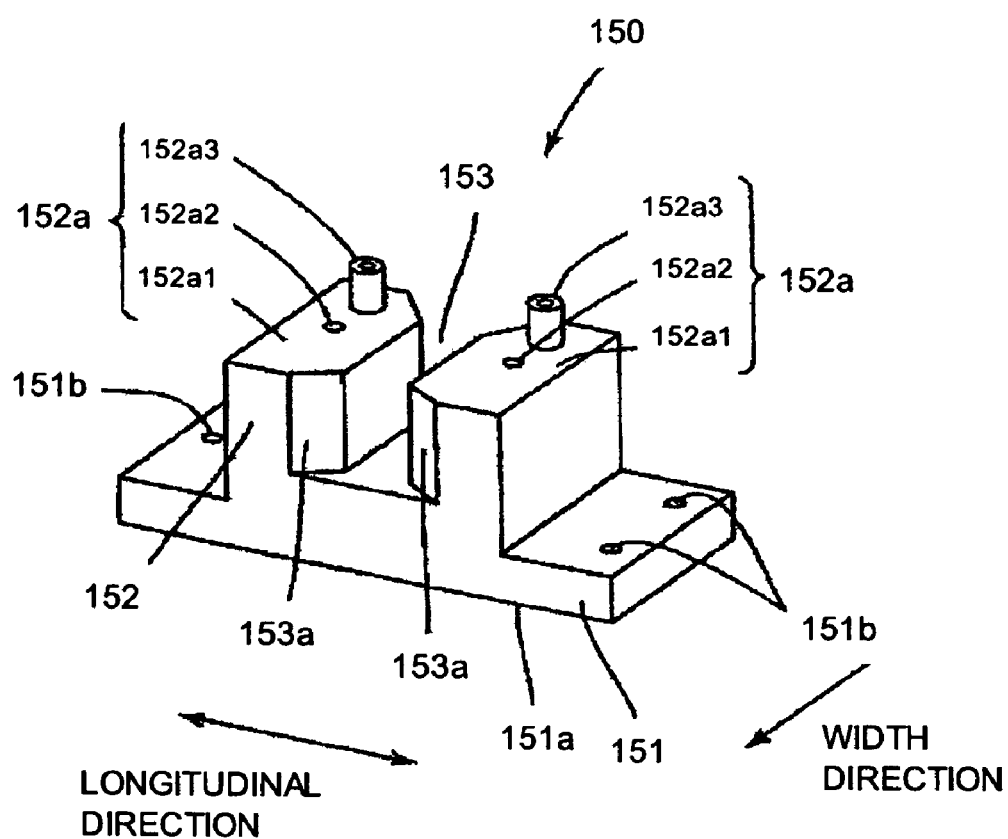
FIG. 12 is a perspective view of an attachment.

FIG. 12 is a perspective view of one of the attachments 150.

Each of the attachments 150 is approximately composed of a base part 151 having an approximately rectangular plate shape and a projecting part 152 projecting approximately perpendicularly from one side of the base part 151. The length in the longitudinal direction of the projecting part 152 is shorter than the length in the longitudinal direction of the base part 151. The length in the width direction of the projecting part 152 is approximately identical with the length in the width direction of the base part 151. The other side where no projecting part 152 is formed of the base part 151 is a panel fixing surface 151a which is used to fix the attachment 150 to the back of the PDP 10. The base part 151 has plural screw holes 151b. The panel fixing surface 151a of the attachment 150 abuts on a prescribed part on the back of the PDP 10. The attachment 150 is screwed to the PDP 10 using the screw holes 151b and also screw holes provided in the prescribed part.

A concave portion 153 having a prescribed depth and crossing the projecting part 152 in the width direction is formed in about the center of an upper end surface 152a1 of the projecting part 152. The concave portion 153 is beveled, forming bevels 153a, where it ends at each side of the projecting part 152, with the bevels 153a making the concave portion 153 wider at its parts closer to each side of the projecting part 152. The upper end surface 152a1, in about the center of which the concave portion 153 is formed, has plural screw holes 152a2 and plural bosses 152a3. A portion which includes the upper end surfaces 152a1 and the screw holes 152a2 and the bosses 152a3 that are formed in the upper end surface 152a1 will hereinafter be generically referred to as a bracket fixing portion 152a.

In this configuration, the upper end surfaces 152a1 or the bosses 152a3 in the bracket fixing portion 152a of the attachment 150 are made to abut on one of the brackets 20 and the attachment 150 is screwed to the bracket 20 using the screw holes 152a2 or the bosses 152a3. In a case where the upper end surfaces 152a1 are made to abut on the bracket 20, through holes to allow the bosses 152a3 to pass through are produced beforehand in corresponding locations on the bracket 20 that oppose the bosses 152a3 so as to prevent the bosses 152a3 from hitting the bracket 20.

Now, revert to FIG. 11 for further description.

As shown in FIG. 11, the brackets 20 are each made of a long plate member bent at plural locations. To be more concrete, an upper end portion and a lower end portion of the long plate member are bent at a prescribed angle toward a same side of the long plate member, and a tip portion of each of the upper and the lower end portions of the long plate member bent as described above is further bent such that the tip portion after being further bent is approximately in parallel with a portion connecting the upper and the lower end portions of the long plate member. The portion connecting the upper and the lower end portions of the long plate member constitutes a main part 21. The tip portion of the upper end portion of the long plate member bent to be approximately in parallel with the main part 21 constitutes a frame abutting surface 22a. The tip portion of the lower end portion of the long plate member bent to be approximately in parallel with the main part 21 constitutes a frame abutting surface 22b. The portion connecting the main part 21 and the frame abutting surface 22a constitutes the connecting part 23a, and the portion connecting the main part 21 and the frame abutting surface 22b constitutes the connecting part 23b.

In the above configuration, the attachments 150 are fixed at prescribed locations on the back of the PDP 10. In the present embodiment, two of the attachments 50 are used for each of the brackets 20. The number of the brackets 20 used is two. The brackets 20 are fixed to be apart from each other by a prescribed distance with their longitudinal direction coinciding with the vertical direction of the PDP 10. Hence, the attachments 150 totaling four are attached to a pair of upper and lower locations on each of the right-hand and the left-hand sides of the back of the PDP 10. The attachments 150 are fixed such that their longitudinal direction coincides with the lateral direction of the PDP 10.

After the attachments 150 are fixed to the PDP 10, the brackets 20 and the attachments 150 are fixed. Namely, the surface on the side, toward which the connecting parts 23a and 23b are bent, of the main part 21 of one of the brackets 20 is brought close to the two attachments 150 fixed in the upper and the lower location on the right-hand side of the back of the PDP 10. The bracket 20 and the two attachments 150 are then fixed, with the bracket fixing portion 152a of each of the two attachments 150 and a corresponding portion of the main part 21 abutting against each other. In the similar manner, the other of the brackets 20 is fixed to the two attachments 150 fixed in the upper and the lower location on the left-hand side of the back of the PDP 10.

Through the above steps, the PDP 10 is fixed to the two brackets 20 via the attachments 150. In the present embodiment, the length in the longitudinal direction of each of the brackets 20 is approximately the same as the vertical width of the frame 30. Therefore, as described above, when the brackets 20 are fixed to the PDP 10, the frame abutting surfaces 22a and 22b protrude beyond the upper and the lower edges of the PDP 10, respectively.

The present invention also brings about the following effects.

Figure 13:
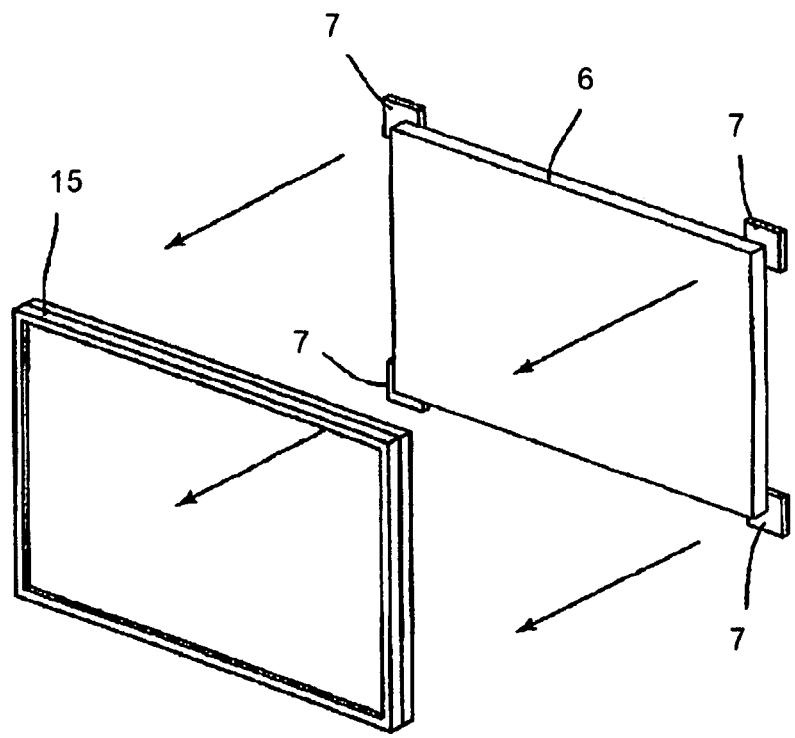
FIG. 13 is a perspective view of a conventional flat panel television assembly.

Conventionally, as shown in FIG. 13, a flat panel display 6 such as a plasma display panel is fixed to a front cabinet 5. Therefore, in a component fitting process or in an adjustment process for the flat panel display 6, too, they work on the flat panel display 6 fixed to and hence supported by the front cabinet 5. When the flat panel display 6 fixed to the front cabinet 5 is made go through production processes, the front cabinet 5 is subjected to various impacts and loads, both human-induced and accidental. It then occurs that the flat panel display 6 is judged defective due to, for example, flaws or deformity found on or in the front cabinet 5 in final inspection before shipment.

In the present invention, the brackets 20 each combined with one of the leg members 60 into a single structure fix the PDP 10 and the frame 30. By making the PDP 10 and the frame 30 both supported by the leg members 60 and the brackets 20 go through various processes, all installation and maintenance processes for devices to be accommodated in the cabinet 40 can be finished without requiring the cabinet 40 to be installed. Since the cabinet 40 is required to be installed only in a final stage of an assembly line, it has almost no chances to be subjected to an unwanted load or impact. As a result, the incidence of the product being judged defective due to flaws or deformity found on or in the cabinet 40 is greatly reduced compared with when the conventional method is used.

As described above, the PDP 10 is fixed, via the attachments 150, to the brackets 20 connected to the leg members 60. The frame 30 is fixed to the frame abutting surfaces 22a and 22b of the brackets 20. Lastly, the cabinet 40 is fixed to the frame 30. As a result, the cabinet 40 can be prevented from becoming defective, for example, getting deformed on account of the weight of the PDP 10 applied to it. At the same time, loads applied to the cabinet 40 can be maximally prevented from propagating to the PDP 10. In a production line, the cabinet 40 can be prevented from being subjected to unwanted impacts or loads.

I claim:

1. A plasma television equipped with a plasma display panel installed in a cabinet and supporting members supporting the plasma display panel at a back thereof via prescribed connecting members, the plasma television comprising:

fixing members provided, to have the connecting members fixed thereto, in prescribed locations on the back of the plasma display panel;

the connecting members each comprising a base part having an approximately rectangular plate shape and a projecting part projecting approximately perpendicularly from one side of the base part, the base part having a plurality of first fixtures formed in a plurality of locations for fixation to the fixing members and the projecting part having, in an end portion thereof, a plurality of surfaces differing in height in a direction of height of the fixing members, the plurality of surfaces each having a second fixture formed for fixation to one of the supporting members; and the supporting members comprising approximately perpendicularly erected leg members and brackets which, by being connected to the leg members, support the plasma display panel at a prescribed height, the brackets each having clearance holes formed in a plurality of portions in vicinity of a portion to be fixed using one of the second fixtures, the plurality of portions including portions which oppose other surfaces protruding beyond a surface where the one of the second fixtures is formed, and the clearance holes being designed to prevent the other surfaces from hitting the brackets;

wherein a surface on a side where no projecting part is formed of the base part of each of the connecting members abuts on one of the fixing members and the each of the connecting members is fixed to the one of the fixing members using a prescribed one of the plurality of the first fixtures and wherein one of the surfaces in the end portion of the projecting part abuts on one of the brackets and is fixed to the one of the brackets using the second fixture formed on the abutting surface, thereby allowing, even in a case where the connecting members are used being placed between one of a plurality of kinds of the plasma display panels provided with the fixing members which differ, between the plurality of kinds of the plasma display panels, both in location on and in height from the back of the plasma display panels and the brackets, the connecting members to fix each of the plurality of kinds of the plasma display panels approximately at the same location relative to the brackets.

2. A flat panel display fixing structure for fixing a flat panel display to supporting members for supporting the flat panel display via prescribed connecting members, wherein each of the connecting members has fixtures formed in a plurality of locations in a portion which opposes a fixation portion of the flat panel display where the each of the connecting members is fixed and in a portion which opposes one of the supporting members, and wherein, in a case where the connecting members are used between one of a plurality of kinds of the flat panel displays with the fixation portions varying in location and height between the plurality of kinds of the flat panel displays, the connecting members fix each of the plurality of kinds of the flat panel displays approximately at the same location relative to the supporting members by fixing each of the plurality of the flat panel displays and the supporting members using any of the fixtures formed in the portions opposing the fixation portions or the portions opposing the supporting members, the supporting members comprise approximately perpendicularly erected leg members and brackets which, by being connected to the leg members, support the flat panel display at a prescribed height; and wherein each of the connecting members comprises a base part having an approximately rectangular plate shape and a projecting part approximately perpendicularly projecting from one side of the base part, the base part abutting with a surface on a side where no projecting part is formed, on the fixation portion and the projecting part having a plurality of surfaces differing in height in a direction of height of the fixation portion with each of the plurality of the surfaces having one of the fixtures formed thereon and fixes one of the supporting members using a fixture formed on one of the plurality of the surfaces which abuts on the one of the supporting members, and wherein each of the supporting members has clearance holes formed in portions to oppose other surfaces more projecting than the abutting surface to prevent the other surfaces from hitting the each of the supporting members.

3. The flat panel display fixing structure according to claim 2, wherein a plurality of the clearance holes are formed in vicinity of a portion to be fixed using the fixture formed on the surface that abuts on the one of the supporting members.

4. The flat panel display fixing structure according to claim 2, wherein the connecting members each have a fixture for connecting a prescribed member other than supporting members to a prescribed location on the flat panel display.

5. The flat panel display fixing structure according to claim 2, wherein each of the connecting members has a concave portion large enough for each of the leg members to pass through and, when one of the leg members and one of the brackets are connected, one end of the one of the leg members is guided into the concave portion.

6. The flat panel display fixing structure according to claim 2, wherein the flat panel display is a plasma display panel.

7. The flat panel display fixing structure according to claim 2, wherein the fixtures comprise screw holes and screws to be used for fixation.

8. A plasma television provided with a cabinet having an approximately rectangular opening at about a center of a front wall thereof and a plasma display panel installed in the cabinet, a display screen of the plasma display panel facing the opening, wherein the plasma television comprises, brackets which are each made of a long plate member having an upper and a lower end portions bent toward a same side thereof, a tip portion of each of the upper and the lower end portions thus bent further bent such that the tip portion after being further bent is approximately in parallel with a portion connecting the upper and the lower end portions of the long plate member, with the lower end portions of the brackets having a through hole;

the plasma television at a the plasma display panel fixed at a back thereof to fixtures;

one or more connecting members coupled at a first end to the fixtures, and at a second end with the brackets, with the connecting members having a concave portion:

vertically erected leg members passed through the through hole of the lower end portions of the brackets and the concave portion of the connecting members and coupled with both for supporting approximately whole of the plasma television at a prescribed height;

a frame member which encloses edges of the plasma display panel and which is fixed, at portions thereof to oppose the tip portions of the upper and the lower end portions of each of the brackets, to the brackets; and a cabinet accommodating and being fixed to the frame member.

9. A flat panel television provided with a cabinet and a flat panel display installed in the cabinet, wherein the flat panel display and a frame member enclosing edges of the flat panel display are, in a state in which neither of them applies own weight to the other, fixed to supporting members for supporting approximately whole of the flat panel television, and flat panel display is fixed at a back thereof to a fixture, with one or more connecting members coupled at a first end to the fixture, and at a second end with a a lower end portion of the bracket includes a through hole, and the connecting members have a concave portion;

wherein the cabinet is fixed to the frame member, which, in turn, is coupled with the supporting members, the supporting members comprise approximately vertically erected leg members that pass through the through hole of the lower end portion of the bracket and the concave portion of the connecting members and couple with both to support approximately the whole of the flat panel television.

10. The flat panel television according to claim 9, wherein the brackets are each made of a long plate member having an upper and the lower end portions bent toward a same side thereof, a tip portion of each of the upper and the lower end portions thus bent further bent such that the tip portion after being further bent is approximately in parallel with a portion connecting the upper and the lower end portions of the long plate member, and wherein the tip portion of each of the upper and the lower end portions fixes an opposing portion of the frame member.

11. The flat panel television according to claim 9, wherein the flat panel display is a plasma display panel.

* * * * *